United States Patent
Ohkubo et al.

[11] Patent Number: 5,910,972
[45] Date of Patent: Jun. 8, 1999

[54] BONE IMAGE PROCESSING METHOD AND APPARATUS

[75] Inventors: Takeshi Ohkubo; Kazuo Shimura, both of Kanagawa-ken, Japan

[73] Assignee: Fuji Photo Film Co., Ltd., Kanagawa-ken, Japan

[21] Appl. No.: 08/937,602

[22] Filed: Sep. 25, 1997

[30] Foreign Application Priority Data

Sep. 25, 1996 [JP] Japan ................................. 8-253258
Sep. 27, 1996 [JP] Japan ................................. 8-256943

[51] Int. Cl.$^6$ ........................................ G06T 5/00
[52] U.S. Cl. ................................. 378/54; 378/57
[58] Field of Search ........................... 378/54, 56, 57, 378/58, 98.9, 98.11, 98.12

[56] References Cited

U.S. PATENT DOCUMENTS

| | | | |
|---|---|---|---|
| 4,769,756 | 9/1988 | Webber et al. | 382/174 |
| 4,855,598 | 8/1989 | Ohgoda et al. | 250/327.2 |
| 5,122,664 | 6/1992 | Ito et al. | 250/327.2 |
| 5,748,704 | 5/1998 | Mazess et al. | 378/54 |
| 5,774,520 | 6/1998 | Bolotin | 378/54 X |

OTHER PUBLICATIONS

"Extraction of Small Calcified Patterns With A Morphology Filter Using A Multiply Structure Element", Collected Papers of The Institute of Electronics and Communication Engineers of Japan, D–II, vol. J75–D–II, No. 7, pp. 1170–1176, Jul. 1992.

"Fundamentals of Morphology and Its Application to Mammogram Processing", Medical Imaging Technology, vol. 12, No. 1, Jan. 1994.

Medical Imaging Technology, vol. 11, No. 3, Jul. 1993, pp. 373–374.

*Primary Examiner*—David P. Porta
*Attorney, Agent, or Firm*—Sughrue, Mion, Zinn, Macpeak & Seas, PLLC

[57] ABSTRACT

Two radiation images of a single object, which comprises a soft tissue and a bone tissue, are formed respectively with two kinds of radiation having different energy distributions, the two radiation images being to be subjected to energy subtraction processing. The energy subtraction processing is carried out on the two radiation images, and a bone image, in which the pattern of the bone tissue in the object has been extracted or emphasized, is thereby formed. Numerical information concerning the density of the bone constituent is obtained in accordance with the bone image. A bone trabecula pattern emphasizing process is carried out on the bone image, and information representing the form of bone trabeculae is thereby obtained.

38 Claims, 21 Drawing Sheets

F I G. 9
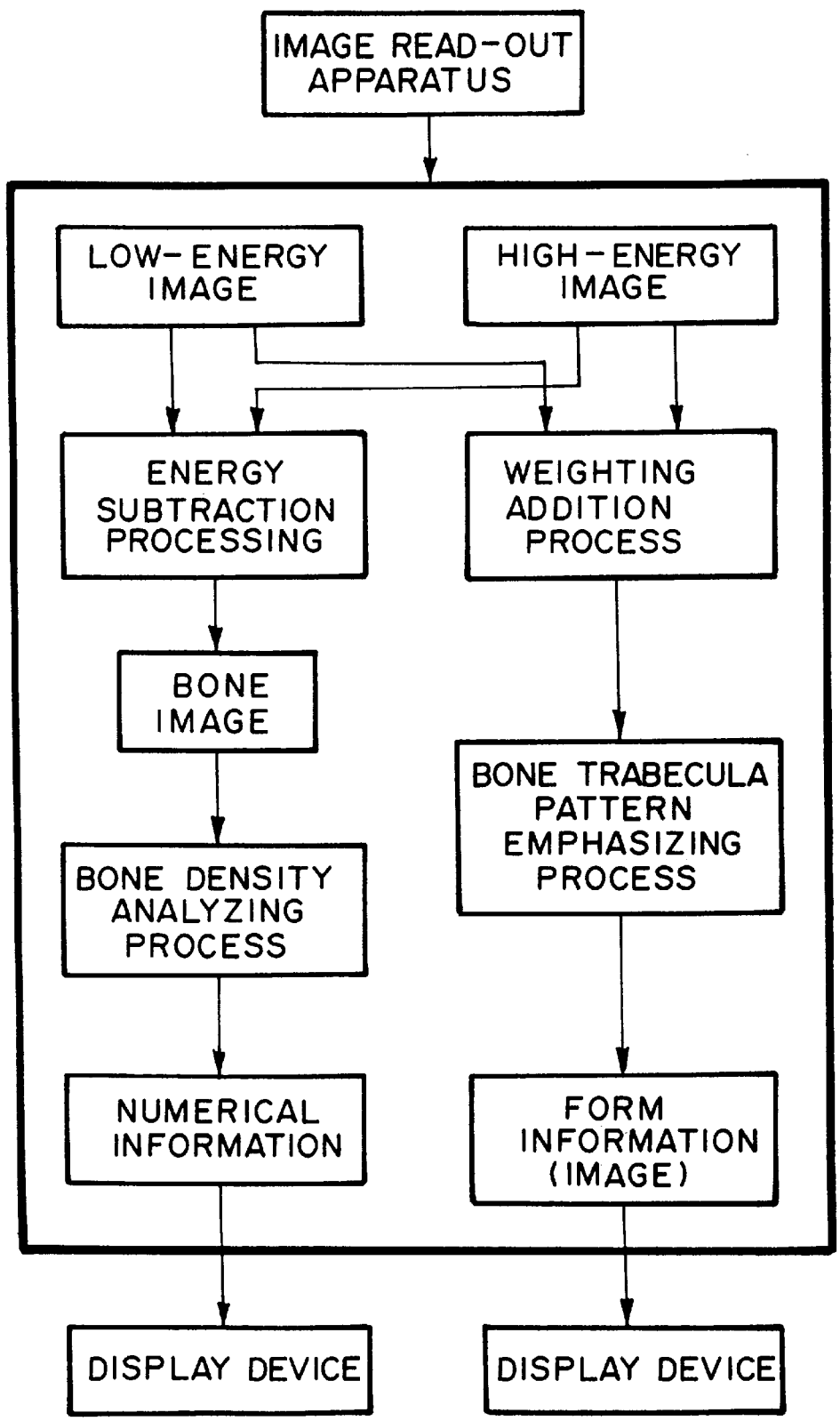

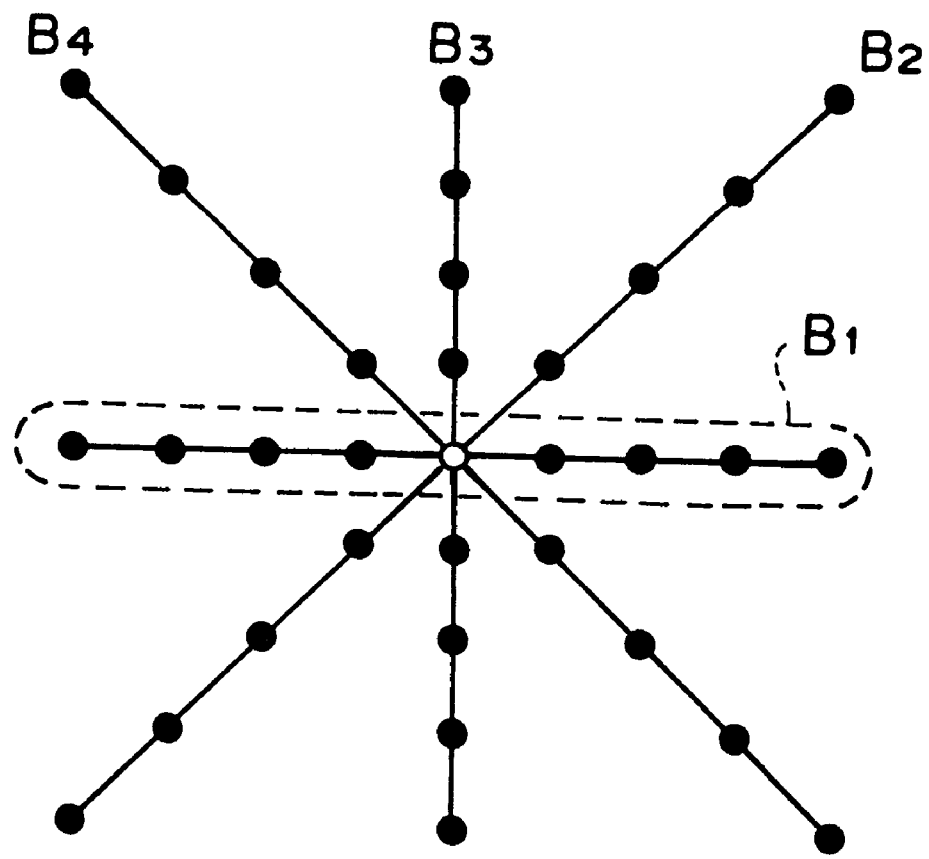
F I G.11

F I G. 13A
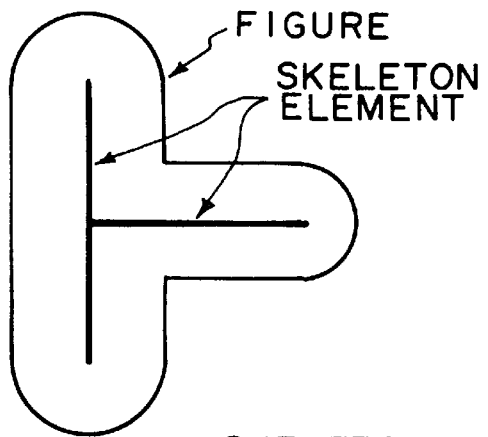
F I G. 13B
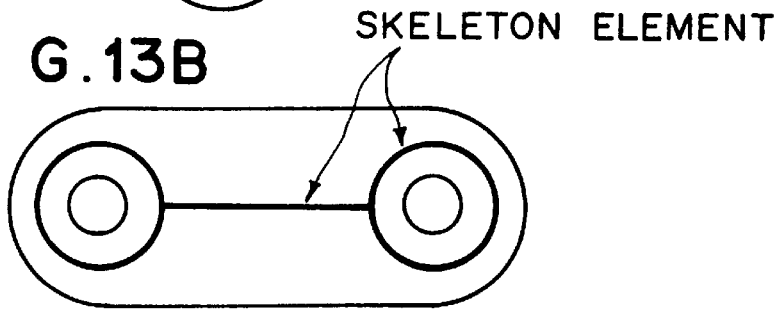
F I G. 13C
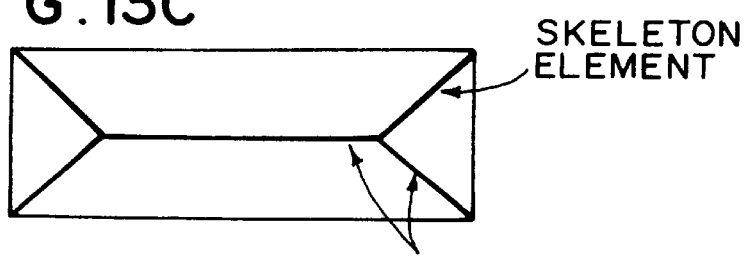
F I G. 13D
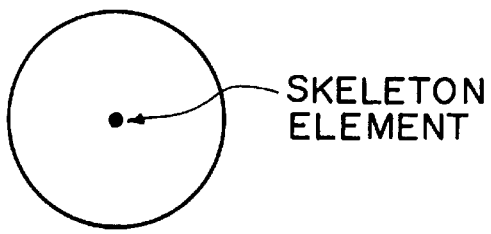
F I G. 13E
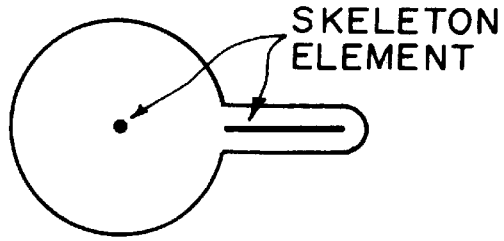

F I G. 19
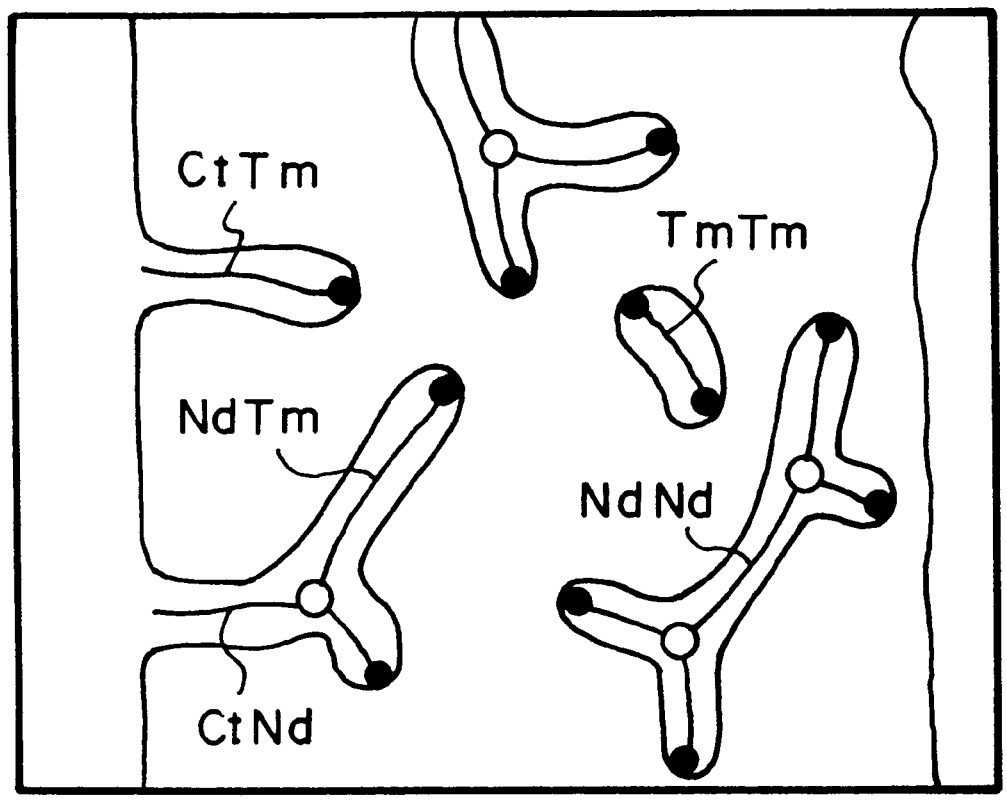

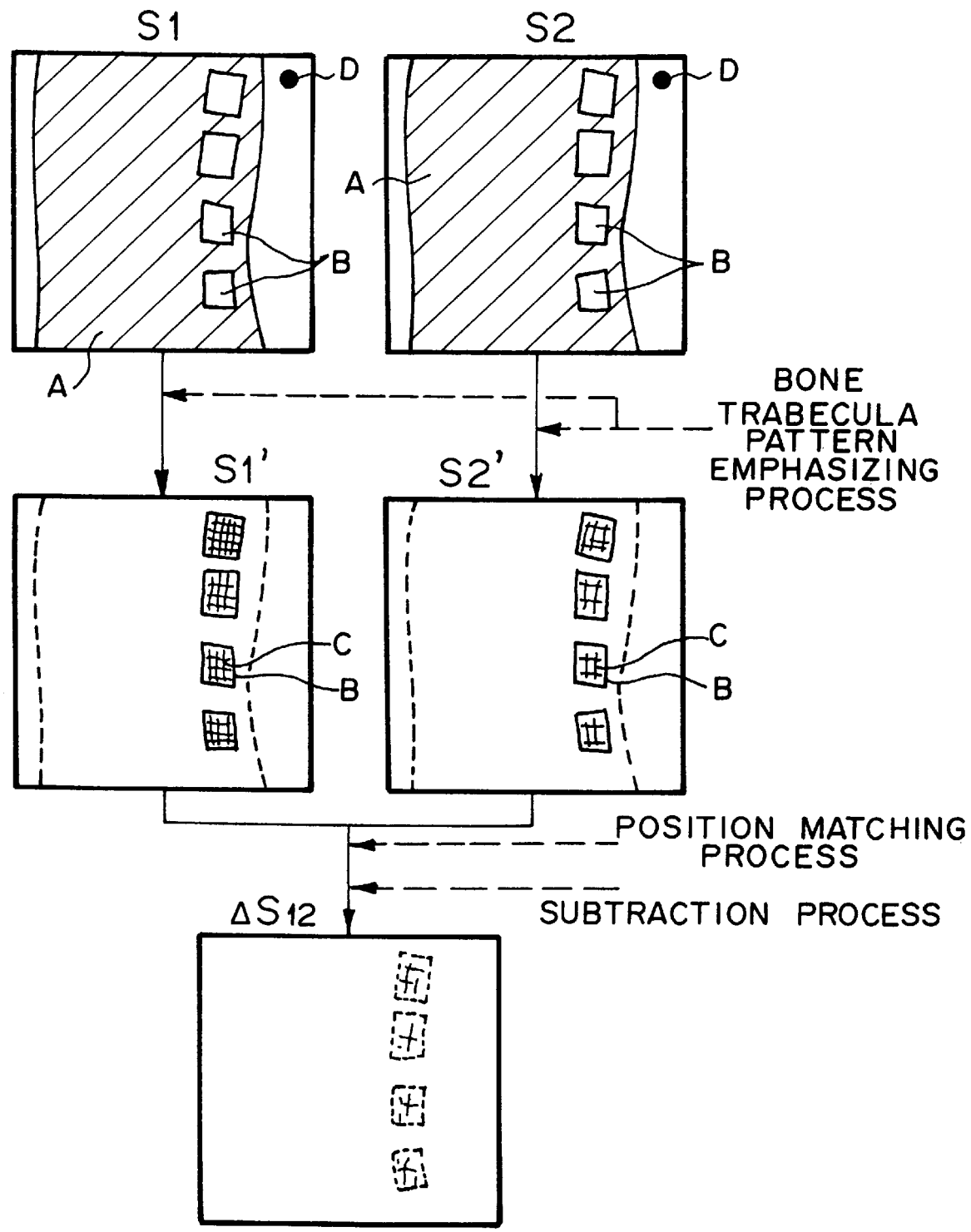

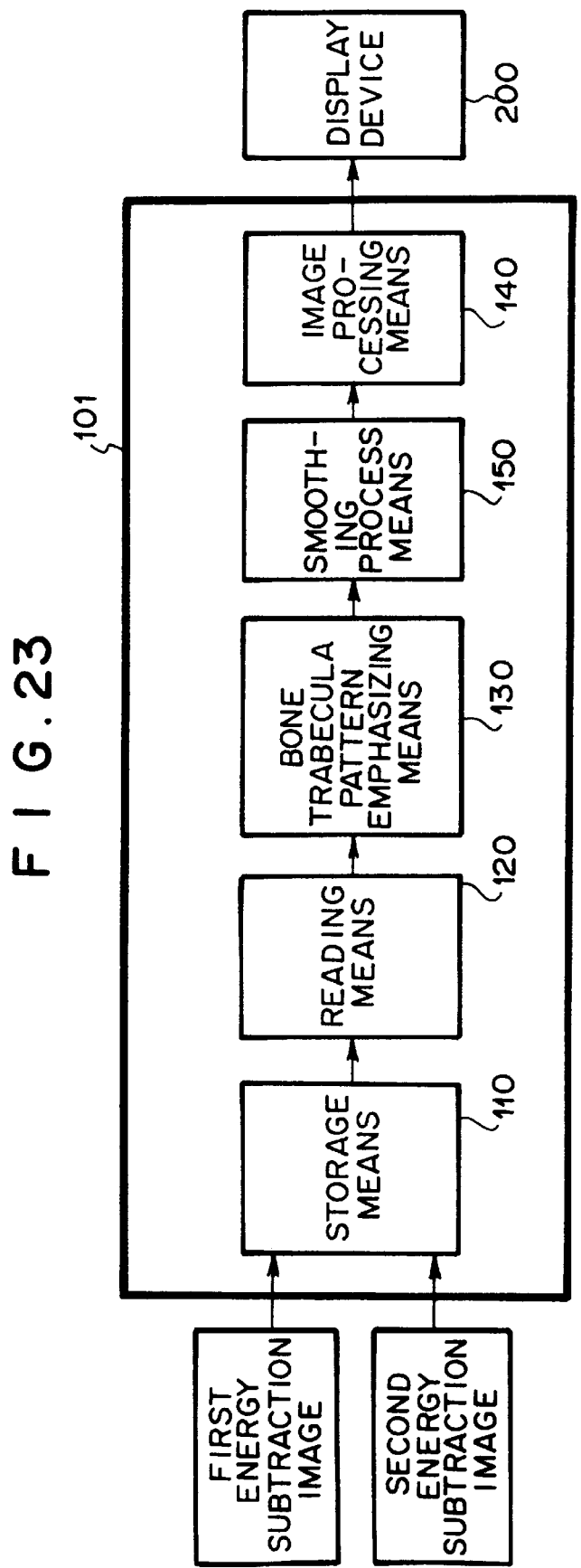

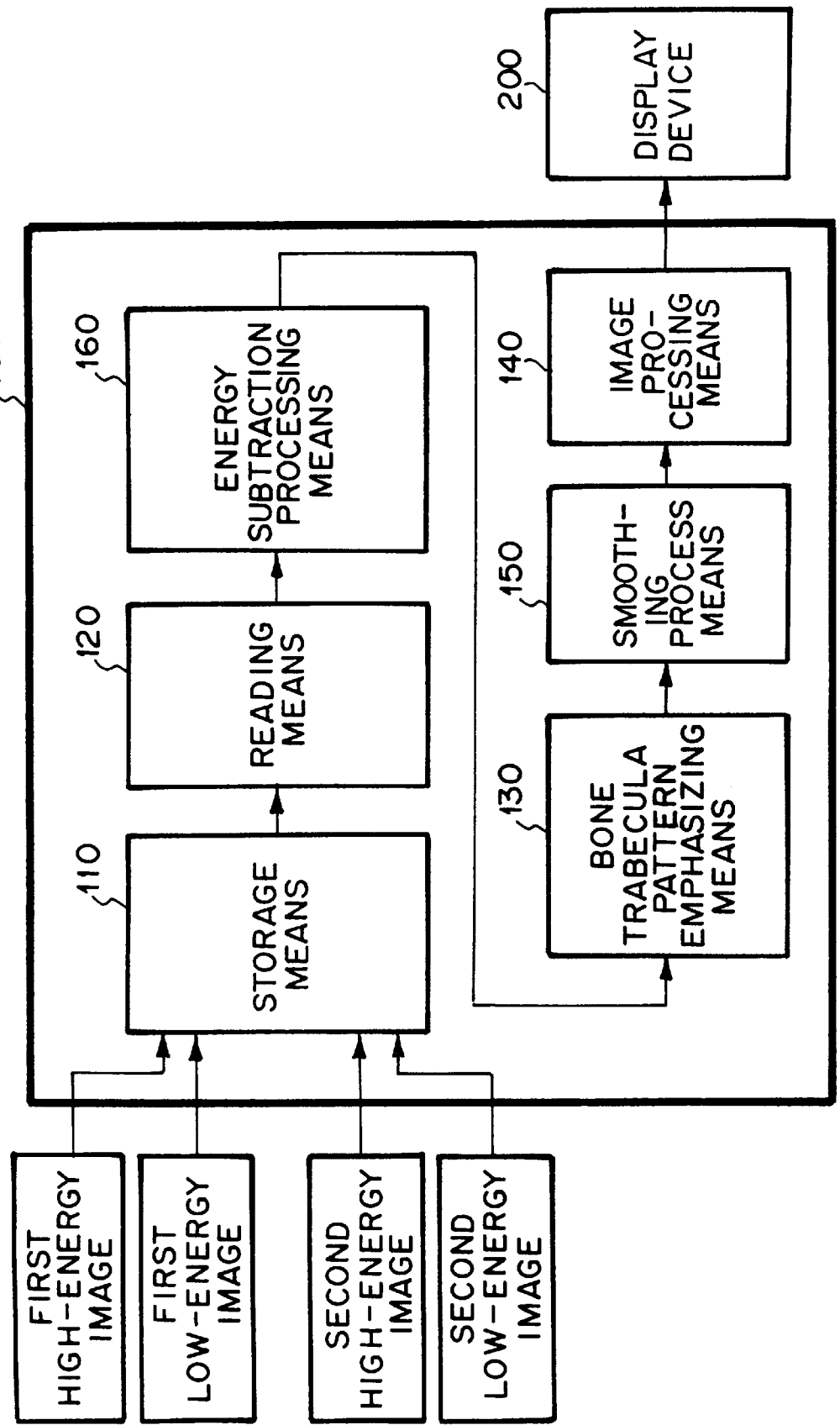

BONE IMAGE PROCESSING METHOD AND APPARATUS

BACKGROUND OF THE INVENTION

1. Field of the Invention

This invention relates to a method and apparatus for acquiring information concerning a bone constituent in a bone of a human body, or the like. This invention particularly relates to a bone image processing method and apparatus for acquiring numerical information concerning the density of a bone constituent and image information representing the form of bone trabeculae, the information being useful in making a diagnosis of osteoporosis, or the like. This invention also relates to a bone image processing method and apparatus for acquiring information representing a change of bone trabeculae of an object from temporally different image signals representing images of the object.

2. Description of the Prior Art

Bone mineral analysis, i.e., quantitative determination of amounts of calcium in bones, is useful for making a diagnosis for preventing fractures of bones.

Specifically, the amounts of the bone mineral are determined by the density of bone trabeculae, which are the cancellous matter constituting the internal regions of bones, i.e. the bone density. Therefore, if the bone density is low, the image density of a bone pattern in a bone image will become high. If the bone density is high, the image density of the bone pattern in the bone image will become low.

Therefore, by investigating small changes in the amounts of calcium contained in bones, osteoporosis can be found early, and fractures of the bones can be prevented.

Various techniques for bone mineral analysis have been proposed and used in practice. Such techniques include microdensitometry (MD technique), single photon absorptiometry (SPA technique), dual photon absorptiometry (DPA technique), quantitative digited radiography (QDR technique), quantitative computer tomography (QCT technique), and dual energy quantitative computer tomography (DQCT technique).

However, the aforesaid techniques have the drawbacks in that amounts of the bone mineral in vertebral bones, which directly indicate the sign of an osteoporosis, cannot be determined, in that a large-scaled apparatus must be used, or in that the radiation dose cannot be kept small.

Accordingly, in U.S. Pat. No. 5,122,664, the applicant proposed a novel method for quantitatively analyzing a bone mineral, wherein energy subtraction processing is employed.

Specifically, the applicant proposed a method for quantitatively analyzing a bone mineral by carrying out energy subtraction processing wherein each of at least two recording media (such as stimulable phosphor sheets or sheets of X-ray film) is exposed to one of at least two kinds of radiation, which have different energy distributions and carry image information of an object comprising a bone tissue and a soft tissue, radiation images of the object are thereby recorded on the recording media, a digital image signal made up of a series of image signal components representing each radiation image is detected from each recording medium, the image signal components of the digital image signals thus obtained, which image signal components represent corresponding picture elements in the radiation images, are then subtracted from each other such that the soft tissue pattern may be erased, and a difference signal is thereby obtained which represents the image of only the bone tissue (a bone image). The proposed method for quantitatively analyzing a bone mineral comprises the steps of:

i) recording a pattern of a bone mineral reference material, which simulates bones of a human body and in which known amounts of the bone mineral vary step-wise, together with the pattern of the object when each of the radiation images of the object is recorded on each of the recording media, and ii) quantitatively analyzing the amount of the bone mineral by comparing the image density of the pattern of the bone tissue and the image density of the pattern of the bone mineral reference material with each other, both patterns appearing in the bone image.

With the method proposed in U.S. Pat. No. 5,122,664, the density of the bone constituent can be determined accurately. However, there is a strong demand for a technique for furnishing information more useful in making a diagnosis of osteoporosis.

Specifically, even if the numerical information concerning the bone density alone is presented, it will be difficult for the condition of bone trabeculae to be ascertained.

SUMMARY OF THE INVENTION

The primary object of the present invention is to provide a bone image processing method, which acquires the information useful for making a diagnosis such that the condition of bone trabeculae in a bone tissue may be ascertained easily.

Another object of the present invention is to provide a bone image processing method, which acquires information representing a change of bone trabeculae of an object with the passage of time such that the change may be seen easily.

The specific object of the present invention is to provide an apparatus for carrying out the bone image processing method.

First and second bone image processing methods and a first bone image processing apparatus in accordance with the present invention are characterized by carrying out energy subtraction processing on radiation images, numerical information concerning the density of a bone constituent being thereby obtained, and carrying out a bone trabecula pattern emphasizing process on a radiation image, information representing the form of bone trabeculae being thereby obtained. The numerical information concerning the density of the bone constituent and the information representing the form of bone trabeculae enable the condition of bone trabeculae to be ascertained easily and are therefore markedly useful in making an accurate diagnosis of, particularly, osteoporosis.

Specifically, the present invention provides a first bone image processing method, wherein two radiation images of a single object, which comprises a soft tissue and a bone tissue, are formed respectively with two kinds of radiation having different energy distributions, the two radiation images being to be subjected to energy subtraction processing, and information concerning the density of a bone constituent in the bone tissue is obtained from the two radiation images, the method comprising the steps of:

i) carrying out the energy subtraction processing on the two radiation images, a bone image, in which the pattern of the bone tissue in the object has been extracted or emphasized, being thereby formed, ii) obtaining numerical information concerning the density of the bone constituent in accordance with the bone image, and iii) carrying out a bone trabecula pattern emphasizing process on the bone image, information representing the form of bone trabeculae being thereby obtained.

In the first bone image processing method in accordance with the present invention, an index value representing a bone trabecula structure may be calculated in accordance with the information representing the form of bone trabeculae. Also, the condition of the bone tissue of the object may be judged in accordance with the numerical information concerning the density of the bone constituent and the index value representing the bone trabecula structure.

As the bone trabecula pattern emphasizing process, skeleton processing in accordance with a morphology operation should preferably be employed.

The morphology operation (hereinbelow also referred to as the morphology processing) will be described hereinbelow.

The morphology processing is the processing based upon algorithms of morphology, with which only a specific image portion, such as an abnormal pattern, is selectively extracted from an original image. The morphology processing has been studied as a technique efficient for detecting, particularly, a small calcified pattern, which is one of characteristic forms of mammary cancers. However, the image to be processed with the morphology processing is not limited to the small calcified pattern in a mammogram.

The morphology processing is carried out by using a structure element B corresponding to the size and the shape of the image portion to be extracted. The morphology processing has the features in that, for example, it is not affected by complicated background information, and the extracted image pattern does not become distorted.

Specifically, the morphology processing is advantageous over ordinary differentiation processing in that it can more accurately detect the geometrical information concerning the size, the shape, and the image density distribution of the calcified pattern.

How the morphology processing is carried out will be described hereinbelow by taking the detection of a small calcified pattern in a mammogram as an example.

(Fundamental operation of morphology processing)

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to an image density value f(x, y). In this case, it is assumed that the image signal representing the image density value f(x, y) is a high luminance-high signal level type of image signal, in which a low image density (i.e., a high luminance when the image is displayed on a CRT display device) is represented by a high image signal level.

Firstly, as an aid in facilitating the explanation, a one-dimensional function f(x) corresponding to the cross-section of the two-dimensional gray level image is considered. It is assumed that a structure element g used in the morphology operation is a symmetric function of Formula (3) shown below, which is symmetric with respect to the origin.

$$g^s(x) = g(-x) \quad (3)$$

It is also assumed that the value is 0 in a domain of definition G, which is represented by Formula (4) shown below.

$$G = \{-m, -m+1, \ldots, -1, 0, 1, \ldots, m-1, m\} \quad (4)$$

In such cases, the fundamental forms of the morphology operation are very simple operations carried out with Formulas (5), (6), (7), and (8) shown below.

dilation; $[f \oplus G^s](i) = \max\{f(i-m), \ldots, f(i), \ldots, f(+m)\}$ (5)

erosion; $[f \ominus G^s](i) = \min\{f(i-m), \ldots, f(i), \ldots, f(+m)\}$ (6)

opening; $f_g = (f \ominus g^s) \oplus g$ (7)

closing; $f^g = (f \oplus g^s) \ominus g$ (8)

Specifically, as illustrated in FIG. 10A, the dilation processing is the processing for retrieving the maximum value in the region of a width of ±m (which width is the value determined in accordance with the structure element B and corresponds to the mask size shown in FIG. 10A) having its center at a picture element of interest. As illustrated in FIG. 10B, the erosion processing is the processing for retrieving the minimum value in the region of the width of ±m having its center at the picture element of interest. The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 10C, the opening processing is equivalent to the processing for smoothing the image density curve f(x) from the low luminance side, and removing a convex image density fluctuating portion (i.e., the portion at which the luminance is higher than that of the surrounding portions), which fluctuates in a region spatially narrower than the mask size of 2 m.

Also, as illustrated in FIG. 10D, the closing processing is equivalent to the processing for smoothing the image density curve f(x) from the high luminance side, and removing a concave image density fluctuating portion (i.e., the portion at which the luminance is lower than that of the surrounding portions), which fluctuates in the region spatially narrower than the mask size of 2 m.

In cases where the structure element g is not symmetric with respect to the origin, the dilation operation with Formula (5) is referred to as the Minkowski sum, and the erosion operation with Formula (6) is referred to as the Minkowski difference.

In cases where the image signal representing the image density value f(x) is a high image density-high signal level type of image signal, in which a high image density is represented by a high image signal level, the relationship between the image density value f(x) and the image signal value becomes reverse to the relationship between the image density value f(x) and the image signal value in the high luminance-high image signal level type of image signal. Therefore, the dilation processing, which is carried out on the high image density-high signal level type of image signal, coincides with the erosion processing, which is carried out on the high luminance-high signal level type of image signal as shown in FIG. 10B. The erosion processing, which is carried out on the high image density-high signal level type of image signal, coincides with the dilation processing, which is carried out on the high luminance-high signal level type of image signal as shown in FIG. 10A. The opening processing, which is carried out on the high image density-high signal level type of image signal, coincides with the closing processing, which is carried out on the high luminance-high signal level type of image signal as shown in FIG. 10D. Also, the closing processing, which is carried out on the high image density-high signal level type of image signal, coincides with the opening processing, which is carried out on the high luminance-high signal level type of image signal as shown in FIG. 10C.

The morphology processing is herein described with respect to the high luminance-high signal level type of image signal.

(Application to detection of calcified patterns)

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (9) shown below and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = f - \max\{(f \ominus Bi) \oplus Bi\} \quad (9)$$
$$i \in (1, \ldots, M)$$
$$= f - \max\{f_{Bi}\}$$
$$i \in (1, \ldots, M)$$

In Formula (9), Bi (wherein i=1, 2, ..., n) represents n number of linear structure elements, each of which has a size corresponding to the total size of m number of picture elements (in the example shown in FIG. 11, nine-picture element, four-direction structure elements are employed, and m=9, n=4). (The structure elements, as a whole, will hereinbelow be referred to as the m-picture element, n-direction multiply structure element.) In cases where the structure element Bi is set to be larger than the calcified pattern to be detected, a calcified pattern, which is a convex signal change portion finer than the structure element Bi (i.e., which is an image portion fluctuating in a spatially narrow region) and has luminance values larger than the luminance values of the surrounding portions, is removed in the opening processing. On the other hand, an elongated non-calcified pattern, such as a pattern of the mammary gland, is longer than the structure element Bi. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (9), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (9).

As described above, in cases where the image signal is of the high image density-high signal level type, the image density value of the calcified pattern is smaller than the image density values of the surrounding image portions, and the calcified pattern constitutes a concave signal change portion with respect to the surrounding portions. Therefore, the closing processing is applied in lieu of the opening processing, and Formula (10) shown below is applied in lieu of Formula (9).

$$P = f - \max\{(f \ominus Bi) \oplus Bi\} \quad (10)$$
$$i \in (1, \ldots, M)$$
$$= f - \max\{f_{Bi}\}$$
$$i \in (1, \ldots, M)$$

The closing processing carried out with Formula (10), which is an example of the morphology operation, will hereinbelow be described in detail.

Specifically, the morphology operation is carried out on the image density value Sorg, which is represented by the high image density-high signal level type of image signal. With the morphology operation, the maximum value processing (i.e., the dilation processing) is carried out on the image signal, which has a distribution of the image density value Sorg indicated by, for example, the solid line in FIG. 12A, by using a linear structure element B, which is constituted of three picture elements and is shown in FIG. 12B. As a result, an image density value $S_i$ of a certain picture element of interest is converted into $S_i'$, which takes the maximum value $S_{i+1}$, of the values of the three adjacent picture elements (determined by the structure element B) having their center at the picture element of interest. The operation is carried out for all of the picture elements constituting the image, each of them being taken as the picture element of interest. In this manner, the image signal having the distribution of the image density value Sorg indicated by the solid line in FIG. 12A is converted into the maximum value signal having the distribution of the image density value Sorg', which is indicated by the broken line in FIG. 12A.

Thereafter, the minimum value processing (i.e., the erosion processing) is carried out on the maximum value signal, which has been obtained from the maximum value processing, by using the structure element B. As a result, the maximum value signal $S_i'$ corresponding to the picture element of interest indicated by the broken line in FIG. 12A is converted into $S_i''$ ($=S_i$), which takes the minimum value $S_{i-1}$ of the values of the three adjacent picture elements having their center at the picture element of interest. The operation is carried out for all of the picture elements constituting the image, each of them being taken as the picture element of interest. In this manner, the minimum value signal Sorg" having the distribution indicated by the chained line in FIG. 12A is obtained from the minimum value processing. The image signal indicated by the chained line in FIG. 12A has the distribution such that the image portion corresponding to the signal change portion, at which the original image signal Sorg fluctuates in a spatially narrower range than the size of the structure element B, has been eliminated, and such that the image portion corresponding to the signal change portion, at which the original image signal Sorg fluctuates in a spatially wider range than the size of the structure element B, and the image portion, at which the original image signal Sorg does not fluctuates, are kept in the original forms. More specifically, the aforesaid processing (i.e., the closing processing) serves as the processing for smoothing the image density distribution from the high image density side.

The value having been obtained from the closing processing (i.e., the value having been obtained by carrying out the maximum value processing on the original image signal Sorg and then carrying out the minimum value processing)

is subtracted from the original image signal Sorg, and a value Smor is thereby obtained. The thus obtained value Smor represents the image portion corresponding to the signal change portion, at which the signal value fluctuates in a spatially narrower range than the size of the structure element B and which has been eliminated by the aforesaid closing operation.

Fundamentally, an image signal represents spatial coordinates (x, y), which constitute a two-dimensional element, and a signal value f(x, y), which constitutes a third dimensional element. However, in the foregoing, as an aid in facilitating the understanding, the morphology operation is described with respect to the one-dimensional image signal distribution curve, which appears in a predetermined cross section of the image expanded in the two-dimensional plane.

Therefore, actually, it is necessary for the foregoing explanation to be applied to a two-dimensional image. Also, for the processing of a two-dimensional image, the multiply structure element is employed.

The skeleton processing in accordance with the morphology operation will be described hereinbelow.

Ordinarily, the skeleton processing is carried out for extracting skeletons of figures. A skeleton can be considered as being a set of center points of circular disks inscribed in a figure. Specifically, for example, as for the figures, which are indicated by medium-thick solid lines in FIGS. 13A through 13E, the skeletons of the figures are those indicated by the thick solid lines.

How the skeleton processing is carried out in accordance with the aforesaid morphology operation will be described hereinbelow. In such cases, the skeleton processing may be represented by Formula (1) or Formula (2) shown below.

$$Smor = \bigcup_{\lambda=n1}^{N} \left\{ \max_{i=1,\dots,n}(Sorg \ominus \lambda Bi) - \max_{i=1,\dots,n}(Sorg \ominus \lambda Bi)_B \right\} \quad (1)$$

wherein the expression $X \ominus \lambda Y$ represents $\lambda$ times of Minkowski difference operations (erosion processings) carried out with the structure element Y and on the image signal X, the expression $(X \ominus \lambda Y)_y$ represents the opening processing carried out with the structure element Y and on the image signal $(X \ominus \lambda Y)$, and $$\bigcup_{\lambda=n1}^{N} \{\}$$

represents the union of sets of { } with $\lambda$=n1, n1+1, ..., N.

$$Smor = \bigcup_{\lambda=n1}^{N} \left\{ \min_{i=1,\dots,n}(Sorg \oplus \lambda Bi) - \min_{i=1,\dots,n}(Sorg \oplus \lambda Bi)^B \right\} \quad (2)$$

wherein the expression $X \oplus \lambda Y$ represents $\lambda$ times of Minkowski sum operations (dilation processings) carried out with the structure element Y and on the image signal X, the expression $(X \oplus \lambda Y)^Y$ represents the closing processing carried out with the structure element Y and on the image signal $(X \oplus \lambda Y)$, and $$\bigcup_{\lambda=n1}^{N} \{\}$$

represents the union of sets of { } with $\lambda$=n1, n1+1, ..., N.

Formula (1) or Formula (2) is selected in accordance with whether the image is represented by the high image density-high signal level type of image signal or the high luminance-high signal level type of image signal. In cases where the skeleton of an image portion having a low image density (a high luminance) is to be extracted from the image, which is represented by the high image density-high signal level type of image signal, Formula (1) is employed. In cases where the skeleton of an image portion having a low luminance (a high image density) is to be extracted from the image, which is represented by the high luminance-high signal level type of image signal, Formula (2) is employed. There is no substantial difference in effects between Formula (1) and Formula (2).

For example, as for an image formed on negative film (an image represented by the high image density-high signal level type of image signal), the image density of the bone pattern is lower than the image density of the other image portions. Also, the image density of a portion, at which a bone trabecula pattern is located, is low, and the image density of a portion, at which no bone trabecula pattern is located, is high. In such cases, the skeleton processing is carried out with respect to the bone trabecula pattern, which has a lower image density than the image density of the surrounding areas. Therefore, in such cases, Formula (1) may be employed.

FIG. 14 shows an example of the skeleton processing carried out with Formula (1) by employing a circle having a radius r as the structure element B. In FIG. 14, the skeleton processing is carried out on the figure, in which the region outward from the contour of the figure has a high image density, and the region inward from the contour of the figure has a low image density.

As illustrated along the top row in FIG. 14, the erosion processing is firstly carried out on the figure by using the structure element B. At the stage of $\lambda$=0 (0'th erosion processing with the structure element B), no change occurs on the figure.

At the stage of $\lambda$=1 (first erosion processing with the structure element B), the figure is eroded inwardly by a depth corresponding to the radius r of the structure element B.

At the stage of $\lambda$=2 (second erosion processing with the structure element B), the portion projecting from the circle portion of the figure disappears perfectly.

The same operation is repeated. At the stage of $\lambda$=N−1 (N−1'th erosion processing with the structure element B), the figure is eroded to the circle having a radius not larger than the radius r.

The second row in FIG. 14 shows the figures obtained by carrying out the opening processing with the structure element B and on the images, which have been obtained from the respective stages of the erosion processing ($\lambda$=0, 1, 2, ..., N−1, N) with the structure element B.

The third row in FIG. 14 shows the figures obtained by subtracting the figures illustrated along the second row from the figures illustrated along the top row, which figures have been obtained at the corresponding stages of the processing.

As illustrated along the third row in FIG. 14, at the stage of $\lambda$=1, the skeleton element at the portion, which projects from the circle portion of the original figure, is extracted. Also, at the stage of λ=N−1, the skeleton element of the circle portion of the original figure is extracted.

As described above, Formula (1) represents the operations for carrying out the erosion processing on the original figure, thereafter carrying out the opening processing on the resulting figures, subtracting the figures from each other, which have been obtained at the corresponding stages of the processing, and calculating the union of sets of the results of the subtraction.

Formula (2) is efficient for extracting the skeleton elements for a figure, in which the relationship of the image density levels is reverse to the relationship in Formula (1). Formula (2) represents the operations for carrying out the dilation processing on the original figure, thereafter carrying out the closing processing on the resulting figures, subtracting the figures from each other, which have been obtained at the corresponding stages of the processing, and calculating the union of sets of the results of the subtraction, the skeleton elements being thereby extracted.

As the union of sets in each of Formula (1) and Formula (2), the union of sets of only the comparatively large n1 values, e.g. only the union of sets of λ=2, 3, 4, 5, and so on, excluding n1=0, 1, should preferably be employed, and the skeleton elements obtained in this manner should preferably be displayed. In such cases, a change in the condition of the bone trabeculae can be found more easily. Specifically, at the stages of λ=0 and 1, noise components having a markedly high frequency are also extracted. By the exclusion of the noise components from the union of sets, an image can be obtained, which has good image quality and can serve as an effective tool in, particularly, the efficient and accurate diagnosis. This also applies to the bone image processing methods and apparatuses, which will be described later.

In the above-described first bone image processing method and also in the below-described various other methods and apparatuses according to the present invention, including those defined in claims, the expression of "with two kinds of radiation having different energy distributions" does not necessarily mean two separate radiations but includes two kinds of radiations originated from a single radiation wherein, for example, one is a direct radiation from a radiation source, and the other is a radiation from the same radiation source, which has passed through a recording medium (e.g., a stimulable phosphor sheet) and/or a filter, or the like, and the low energy components of which have been filtered out. Therefore, the two radiation images can be formed one after the other by using different radiations having different energy distributions. Alternatively, the two radiation images can be formed simultaneously by using a single radiation and placing two recording media (e.g., stimulable phosphor sheets) one upon the other with or without a filter interposed therebetween. When the filter is not used, the stimulable phosphor sheet located closer to the radiation source serves as a filter for filtering out the low energy components of the radiation.

Specifically, the present invention also provides a second bone image processing method, wherein two radiation images of a single object, which comprises a soft tissue and a bone tissue, are formed respectively with two kinds of radiation having different energy distributions, the two radiation images being to be subjected to energy subtraction processing, and information concerning the density of a bone constituent in the bone tissue is obtained from the two radiation images, the method comprising the steps of:

i) carrying out the energy subtraction processing on the two radiation images, a bone image, in which the pattern of the bone tissue in the object has been extracted or emphasized, being thereby formed, ii) obtaining numerical information concerning the density of the bone constituent in accordance with the bone image, and iii) carrying out a bone trabecula pattern emphasizing process on at least either one of the two radiation images or on an addition image represented by an addition image signal, information representing the form of bone trabeculae being thereby obtained, the addition image signal being obtained by weighting image signal components of each of radiation image signals representing the two radiation images and by adding the weighted image signal components of the radiation image signals to each other, which image signal components represent corresponding picture elements in the two radiation images.

Specifically, in the aforesaid first bone image processing method in accordance with the present invention, the bone trabecula pattern emphasizing process is carried out on the bone image, which has been obtained from the energy subtraction processing carried out on the two radiation images to be subjected to the energy subtraction processing. In the second bone image processing method in accordance with the present invention, before the energy subtraction processing is carried out, the bone trabecula pattern emphasizing process is carried out on at least either one of the two radiation images, which is to be subjected to the energy subtraction processing, or on the addition image represented by the addition image signal. The addition image signal is obtained by weighting the image signal components of each of radiation image signals representing the two radiation images and by adding the weighted image signal components of the radiation image signals to each other, which image signal components represent corresponding picture elements in the two radiation images.

In the second bone image processing method in accordance with the present invention, as in the aforesaid first bone image processing method, an index value representing a bone trabecula structure may be calculated in accordance with the information representing the form of bone trabeculae. Also, the condition of the bone tissue of the object maybe judged in accordance with the numerical information concerning the density of the bone constituent and the index value representing the bone trabecula structure.

In the first and second bone image processing methods in accordance with the present invention, the numerical information concerning the density of the bone constituent may be obtained by:

forming the two radiation images of the single object such that a pattern of a bone mineral reference material, in which the amounts of a bone mineral are known, (i.e., a bone mineral reference material, which simulates bones of a human body and in which known amounts of the bone mineral vary step-wise) may be embedded together with the pattern of the object in each of the two radiation images, forming an image density-to-bone mineral amount conversion table from the image density of the pattern of the bone mineral reference material, which pattern appears in the bone image, and the known amounts of the bone mineral, and converting the image density of the pattern of the bone tissue, which pattern appears in the bone image of the object, to the amount of the bone mineral in accordance with the image density-to-bone mineral amount conversion table.

The technique utilizing the bone mineral reference material is described in, for example, U.S. Pat. No. 5,122,664.

The present invention further provides a first bone image processing apparatus for carrying out the first or second bone image processing method in accordance with the present invention. Specifically, the present invention further provides a first bone image processing apparatus, wherein two radiation images of a single object, which comprises a soft tissue and a bone tissue, are formed respectively with two kinds of radiation having different energy distributions, the two radiation images being to be subjected to energy subtraction processing, and information concerning the density of a bone constituent in the bone tissue is obtained from the two radiation images, the apparatus comprising:

i) an energy subtraction processing means for carrying out the energy subtraction processing on two predetermined image signals, a bone image signal representing a bone image, in which a desired bone tissue pattern embedded in the images represented by the image signals has been extracted or emphasized, being thereby obtained, ii) a bone density analyzing means for obtaining numerical information concerning the density of the bone constituent in accordance with the bone image signal, and iii) a bone trabecula pattern emphasizing means for carrying out a bone trabecula pattern emphasizing process on at least either one of the radiation image signals representing the two radiation images before being subjected to the energy subtraction processing, on an addition image signal representing an addition image, or on the bone image signal having been obtained from the energy subtraction processing, the addition image signal being obtained by weighting image signal components of each of the radiation image signals representing the two radiation images and by adding the weighted image signal components of the radiation image signals to each other, which image signal components represent corresponding picture elements in the two radiation images.

The first bone image processing apparatus in accordance with the present invention may further comprise an index value calculating means for calculating an index value, which represents a bone trabecula structure, in accordance with information representing the form of bone trabeculae, the pattern of which has been emphasized by the bone trabecula pattern emphasizing means. The first bone image processing apparatus in accordance with the present invention may still further comprise a judgment means for making a judgment as to the condition of the bone tissue of the object in accordance with the numerical information concerning the density of the bone constituent and the index value representing the bone trabecula structure.

Also, in the first bone image processing apparatus in accordance with the present invention, the bone trabecula pattern emphasizing means may be a morphology operation means for carrying out skeleton processing in accordance with a morphology operation, which processing is represented by Formula (1) or Formula (2).

In cases where the image signal subjected to the morphology operation is the high image density-high signal level type of image signal, Formula (1) is employed. In cases where the image signal subjected to the morphology operation is the high luminance-high signal level type of image signal, Formula (2) is employed.

As for the image represented by the high image density-high signal level type of image signal, the bone trabecula pattern is expressed as the image portion having a low image density, and therefore Formula (1) is employed. As for the image represented by the high luminance-high signal level type of image signal, the bone trabecula pattern is expressed as the image portion having a high luminance, and therefore Formula (2) is employed.

As the union of sets in each of Formula (1) and Formula (2), the union of sets of only the comparatively large n1 values, e.g. only the union of sets of $\lambda=2, 3, 4, 5$, and so on, excluding n1=0, 1, should preferably be employed, and the skeleton elements obtained in this manner should preferably be displayed. In such cases, a change in the condition of the bone trabeculae can be found more easily.

Further, in the first bone image processing apparatus in accordance with the present invention, the two radiation images of the single object may be formed such that a pattern of a bone mineral reference material, in which the amounts of a bone mineral are known, may be embedded together with the pattern of the object in each of the two radiation images, and the bone density analyzing means may obtain the numerical information concerning the density of the bone constituent by:

forming an image density-to-bone mineral amount conversion table from the image density of the pattern of the bone mineral reference material, which pattern appears in the bone image, and the known amounts of the bone mineral, and converting the image density of the pattern of the bone tissue, which pattern appears in the bone image of the object, to the amount of the bone mineral in accordance with the image density-to-bone mineral amount conversion table.

A third bone image processing method and a second bone image processing apparatus in accordance with the present invention are characterized by carrying out a bone trabecula pattern emphasizing process on each of image signals representing two radiation images of a single object, which radiation images have been recorded at different points of time, and thereby reducing adverse effects of a difference in beam hardening that are given to a pattern of the bone tissue (including the bone trabeculae) due to, for example, a change in thickness of the soft tissue between the two different points of time, at which the radiation images are recorded, and adverse effects of an artifact of the soft tissue due to a shift in position of the soft tissue occurring when the orientation of the object varies between the two different points of time, at which the radiation images are recorded. The image signals, which have been obtained from the bone trabecula pattern emphasizing process, are then subjected to the energy subtraction processing, and an image signal, which represents a change of the bone trabeculae with the passage of time and is free from adverse effects of the soft tissue, is thereby obtained.

Specifically, the present invention still further provides a third bone image processing method, comprising the steps of:

i) reading image signals representing two images, which are to be used for comparison, from an image storage means for storing image signals representing a plurality of images of a single object, which comprises a soft tissue and a bone tissue, the plurality of the images of the single object having been recorded at different points of time, ii) carrying out a bone trabecula pattern emphasizing process on each of the image signals having been read from the image storage means, the pattern of the bone trabeculae in the bone tissue being thereby emphasized, iii) carrying out a position matching process on the emphasized image signals, which have been obtained from the bone trabecula pattern emphasizing process, the positions of the two images represented by the emphasized image signals being thereby matched with each other, and iv) carrying out a subtraction process for subtracting the image signal components of the two emphasized image signals, which have been obtained from the position matching process, from each other, the image signal components representing corresponding picture elements in the two images, a difference signal representing a change of the bone trabeculae with the passage of time being thereby obtained.

In cases where the image signals representing the two images, which are to be used for comparison, are inputted from the exterior, the operation for reading the image signals from the image storage means may be replaced by an operation for recognizing the two inputted image signals.

As the position matching process, one of various known techniques may be employed. For example, in cases where patterns of predetermined position matching markers are recorded together with the pattern of the object when each of the images is recorded, a process for coinciding the positions of the patterns of the markers in the images may be employed. Alternatively, a position matching process utilizing two-dimensional non-linear image deformation may be employed, which is described in, for example, Medical Imaging Technology, Vol. 11, No. 3, July 1993, pp. 373–374.

The difference signal, which has been obtained in the manner described above, may be fed into a recording means, a displaying means, or the like.

In the third bone image processing method in accordance with the present invention, as the image signal representing the image of the single object having been recorded at each point of time, it is possible to employ two image signals representing two images of the single object, which images have been recorded for energy subtraction processing and at each point of time and have been formed respectively with two kinds of radiation having different energy distributions. In such cases, before the bone trabecula pattern emphasizing process is carried out, energy subtraction processing for extracting a pattern of the bone tissue is carried out on the two image signals representing the two images of the single object, which images have been recorded for energy subtraction processing and at each point of time, a bone image signal being thereby obtained. Also, the bone trabecula pattern emphasizing process, the position matching process, and the subtraction process may be carried out on the bone image signals, which have thus been obtained from two different sets of images having been recorded at two different points of time. However, in cases where the image signals stored in the image storage means are the bone image signals having been obtained from the energy subtraction processing, it is unnecessary for the energy subtraction processing to be carried out again.

Also, the third bone image processing method in accordance with the present invention should preferably be modified such that a smoothing process may be carried out on each of the emphasized image signals, which are to be subjected to the position matching process, and at a stage after the bone trabecula pattern emphasizing process but before the position matching process, and the position matching process and the subtraction process may be carried out on the image signals, which have been obtained from the smoothing process.

In cases where the smoothing process is carried out before the position matching process, an artifact due to a shift in position of the bone trabeculae occurring when the orientation of the object varies slightly between the two different points of time, at which the images are recorded, can be reduced.

Further, in the third bone image processing method in accordance with the present invention, in cases where the image signal, which is subjected to the bone trabecula pattern emphasizing process, is the high image density-high signal level type of image signal, as the bone trabecula pattern emphasizing process, skeleton processing in accordance with a morphology operation, which is represented by Formula (1) shown below, should preferably be employed.

$$Smor = \bigcup_{\lambda=n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression $X \ominus \lambda Y$ represents $\lambda$ times of Minkowski difference operations (erosion processings) carried out with the structure element Y and on the image signal X, the expression $(X \ominus \lambda Y)_Y$, represents the opening processing carried out with the structure element Y and on the image signal $(X \ominus \lambda Y)$, and $$\bigcup_{\lambda=n1}^{N} \{\}$$

represents the union of sets of ({ } with $\lambda$=n1, n1+1, . . . , N.

Also, in cases where the image signal, which is subjected to the bone trabeculapattern emphasizing process, is the high luminance-high signal level type of image signal, as the bone trabecula pattern emphasizing process, skeleton processing in accordance with a morphology operation, which is represented by Formula (2) shown below, should preferably be employed.

$$Smor = \bigcup_{\lambda=n1}^{N} \left\{ \min_{i=1,\ldots,n} (Sorg \oplus \lambda Bi) - \min_{i=1,\ldots,n} (Sorg \oplus \lambda Bi)^B \right\} \quad (2)$$

wherein the expression $X \oplus \lambda Y$ represents $\lambda$ times of Minkowski sum operations (dilation processings) carried out with the structure element Y and on the image signal X, the expression $(X \oplus \lambda Y)^Y$ represents the closing processing carried out with the structure element Y and on the image signal $(X \oplus \lambda Y)$, and $$\bigcup_{\lambda=n1}^{N} \{\}$$

represents the union of sets of { } with $\lambda$=n1, n1+1, . . . , N.

In cases where the skeleton processing in accordance with the morphology operation, which is represented by Formula (1) or Formula (2), is employed as the bone trabecula pattern emphasizing process, adverse effects of complicated background information can be restricted, and only the pattern of the bone trabeculae (or the skeletons of the bone trabeculae) can be emphasized efficiently.

The present invention also provides a second bone image processing apparatus for carrying out the third bone image processing method in accordance with the present invention. Specifically, the present invention also provides a second bone image processing apparatus, comprising:

i) a storage means for storing image signals representing a plurality of images of a single object, which comprises a soft tissue and a bone tissue, the plurality of the images of the single object having been recorded at different points of time, ii) a reading means for reading image signals representing two images, which are to be used for comparison, from the storage means, iii) a bone trabecula pattern emphasizing means for carrying out a bone trabecula pattern emphasizing process on each of the image signals having been read from the storage means, and thereby emphasizing the pattern of the bone trabeculae in the bone tissue, and iv) an image processing means for:

carrying out a position matching process on the emphasized image signals, which have been obtained from the bone trabecula pattern emphasizing process, the positions of the two images represented by the emphasized image signals being thereby matched with each other, and carrying out a subtraction process for subtracting the image signal components of the two emphasized image signals, which have been obtained from the position matching process, from each other, the image signal components representing corresponding picture elements in the two images, a difference signal representing a change of the bone trabeculae with the passage of time being thereby obtained.

In the second bone image processing apparatus in accordance with the present invention, as the image signal representing the image of the single object having been recorded at each point of time, it is possible to employ two image signals representing two images of the single object, which images have been recorded for energy subtraction processing and at each point of time and have been formed respectively with two kinds of radiation having different energy distributions. In such cases, the second bone image processing apparatus in accordance with the present invention may further comprise an energy subtraction processing means for carrying out energy subtraction processing on the two image signals representing the two images of the single object, which images have been recorded for energy subtraction processing and at each point of time, such that a pattern of the bone tissue may be extracted, a bone image signal being thereby obtained. Also, the bone trabecula pattern emphasizing means may carry out the bone trabecula pattern emphasizing process on each of the bone image signals, which have thus been obtained from two different sets of images having been recorded at two different points of time.

However, in cases where the image signals stored in the storage means are the bone image signals having been obtained from the energy subtraction processing, it is unnecessary for the energy subtraction processing to be carried out again. Therefore, in such cases, it is unnecessary for the energy subtraction processing means to be provided.

Also, the second bone image processing apparatus in accordance with the present invention should preferably be modified such that it may further comprise a smoothing means for carrying out a smoothing process on each of the emphasized image signals, which are to be subjected to the position matching process. In such cases, an artifact due to a shift in position of the bone trabeculae occurring when the orientation of the object varies slightly between the two different points of time, at which the images are recorded, can be reduced.

Further, in the second bone image processing apparatus in accordance with the present invention, in cases where the image signal, which is subjected to the bone trabecula pattern emphasizing process carried out by the bone trabecula pattern emphasizing means, is the high image density-high signal level type of image signal, as the bone trabecula pattern emphasizing process, skeleton processing in accordance with a morphology operation, which is represented by Formula (1), should preferably be employed. Also, in cases where the image signal, which is subjected to the bone trabecula pattern emphasizing process carried out by the bone trabecula pattern emphasizing means, is the high luminance-high signal level type of image signal, as the bone trabecula pattern emphasizing process, skeleton processing in accordance with a morphology operation, which is represented by Formula (2), should preferably be employed.

With the first and second bone image processing methods and the first bone image processing apparatus in accordance with the present invention, the bone image is obtained by carrying out the energy subtraction processing on the two radiation images, and the numerical information concerning the density of the bone constituent is obtained in accordance with the bone image. Also, the information representing the form of bone trabeculae is obtained by carrying out the bone trabecula pattern emphasizing process on the bone image, the radiation images, or the addition image. In this manner, the condition of the bone trabeculae can be easily ascertained visually, and the information useful for making a diagnosis of, in particular, osteoporosis can be obtained.

Particularly, in cases where the index value representing the bone trabecula structure is calculated in accordance with the information representing the form of bone trabeculae, the condition of the bone trabeculae can be detected as a numerical value. In this manner, the information useful for making a diagnosis of osteoporosis can be obtained quantitatively.

With the third bone image processing method and the second bone image processing apparatus in accordance with the present invention, the bone trabecula pattern emphasizing process is carried out on each of the image signals representing two radiation images of a single object, which radiation images have been recorded at different points of time. In this manner, it is possible to reduce the adverse effects of a difference in beam hardening that are given to the pattern of the bone tissue (including the bone trabeculae) due to, for example, a change in thickness of the soft tissue between the two different points of time, at which the radiation images are recorded, and the adverse effects of an artifact of the soft tissue due to a shift in position of the soft tissue occurring when the orientation of the object varies between the two different points of time, at which the radiation images are recorded. The image signals, which have been obtained from the bone trabecula pattern emphasizing process, are then subjected to the subtraction process. In this manner, an image signal, which represents a change of the bone trabeculae with the passage of time and is free from the adverse effects of the soft tissue, can be obtained. The thus obtained image signal may then be used for reproducing a visible image on a recording medium, such as photographic film, or on a displaying means, such as a cathode ray tube (CRT) display device. Therefore, the change of the bone trabeculae with the passage of time can be seen without being adversely affected by the soft tissue.

Also, with the third bone image processing method and the second bone image processing apparatus in accordance with the present invention, as each of the image signals representing the radiation images, the bone image signal, in which only the pattern of the bone tissue has been emphasized or extracted, may be employed. The bone image signal is obtained by carrying out the energy subtraction processing on a radiation image recorded with radiation having a high energy level (hereinbelow referred to simply as the high-energy image) and a radiation image recorded with radiation having a low energy level (hereinbelow referred to simply as the low-energy image). In such cases, the adverse effects of the soft tissue can be restricted more efficiently than when the aforesaid image signals representing the radiation images are used directly.

Further, with the third bone image processing method and the second bone image processing apparatus in accordance with the present invention, the smoothing process may be carried out on each of the emphasized image signals, which are to be subjected to the position matching process, and at a stage after the bone trabecula pattern emphasizing process but before the position matching process. The position matching process and the subtraction process may then be carried out on the image signals, which have been obtained from the smoothing process. In cases where the smoothing process is thus carried out before the position matching process, an artifact due to a shift in position of the bone trabeculae occurring when the orientation of the object varies slightly between the two different points of time, at which the images are recorded, can be reduced.

Furthermore, with the third bone image processing method and the second bone image processing apparatus in accordance with the present invention, the skeleton processing in accordance with the morphology operation, which is represented by Formula (1) or Formula (2), may be employed as the bone trabecula pattern emphasizing process. In such cases, adverse effects of complicated background information can be restricted, and only the pattern of the bone trabeculae (or the skeletons of the bone trabeculae) can be emphasized efficiently.

BRIEF DESCRIPTION OF THE DRAWINGS

FIG. 9 is a flow chart showing how a further different embodiment of the first bone image processing apparatus in accordance with the present invention operates, FIG. 11 is an explanatory view showing structure elements $B_i$ employed in morphology processing, FIGS. 13A, 13B, 13C, 13D, and 13E are explanatory views showing various figures and their skeletons, FIG. 19 is an explanatory view showing a node-strut analysis, FIG. 22 is an explanatory view showing how a change of bone trabeculae with the passage of time is extracted in the embodiment of FIG. 20, FIG. 23 is a block diagram showing a second embodiment of the second bone image processing apparatus in accordance with the present invention, and FIG. 24 is a block diagram showing a third embodiment of the second bone image processing apparatus in accordance with the present invention.

DESCRIPTION OF THE PREFERRED EMBODIMENTS

The present invention will hereinbelow be described in further detail with reference to the accompanying drawings.

Figure 1:
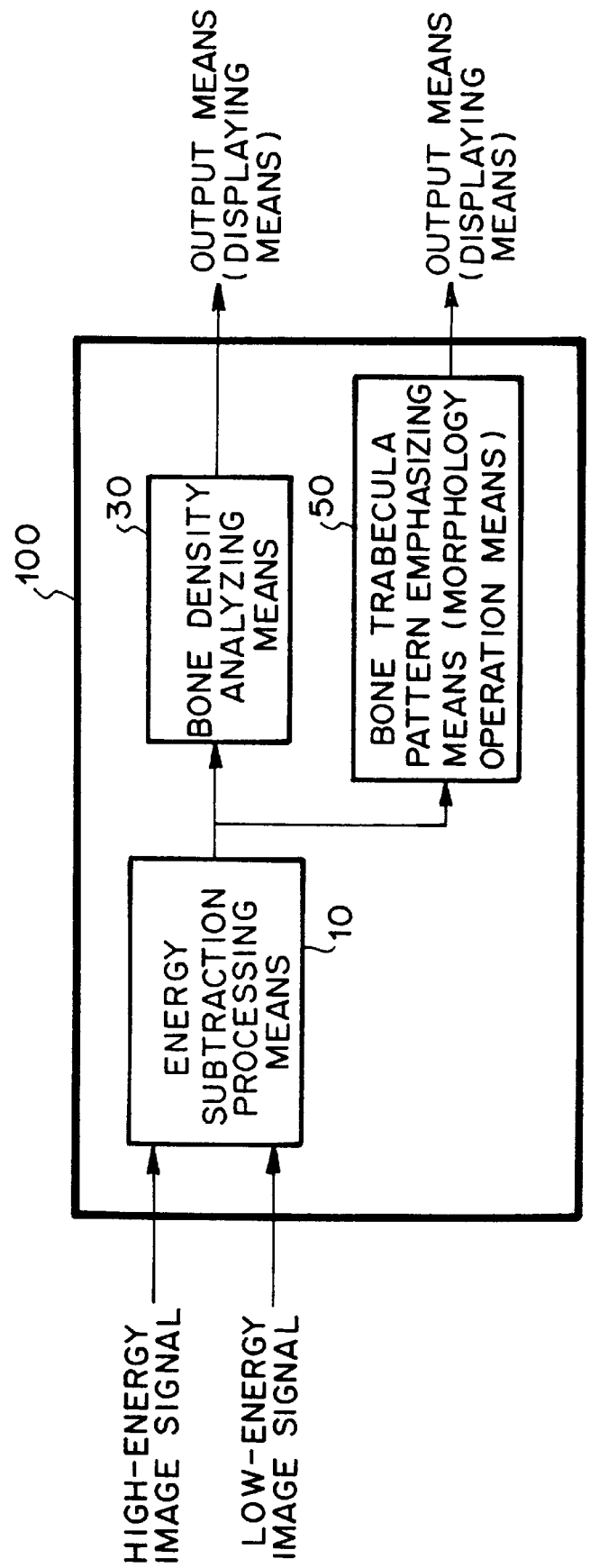
FIG. 1 is a block diagram showing an embodiment of the first bone image processing apparatus in accordance with the present invention.
Figure 2:
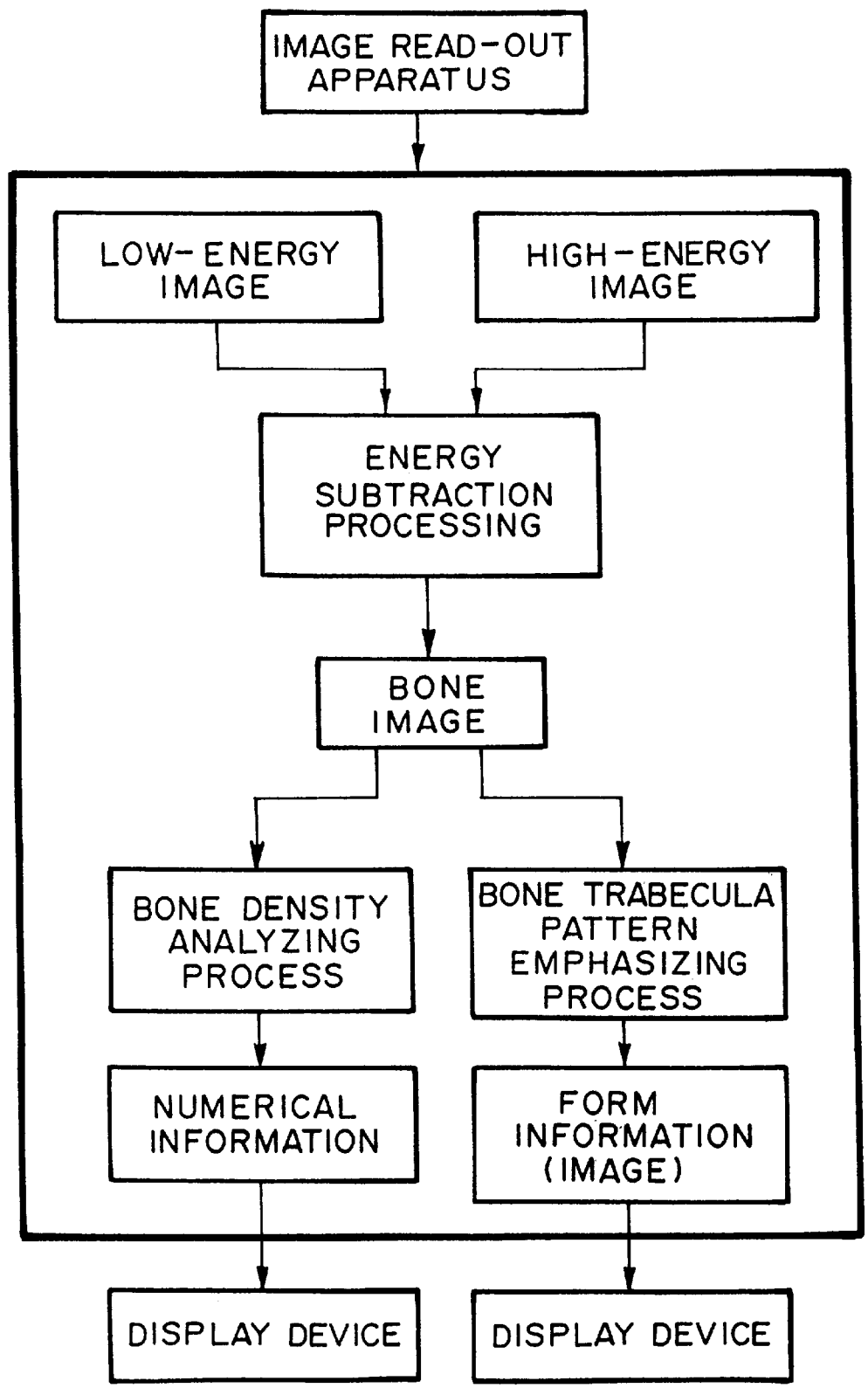
FIG. 2 is a flow chart showing how the embodiment of FIG. 1 operates.

FIG. 1 is a block diagram showing an embodiment of the first bone image processing apparatus in accordance with the present invention. FIG. 2 is a flow chart showing how the embodiment of FIG. 1 operates.

Figure 3:
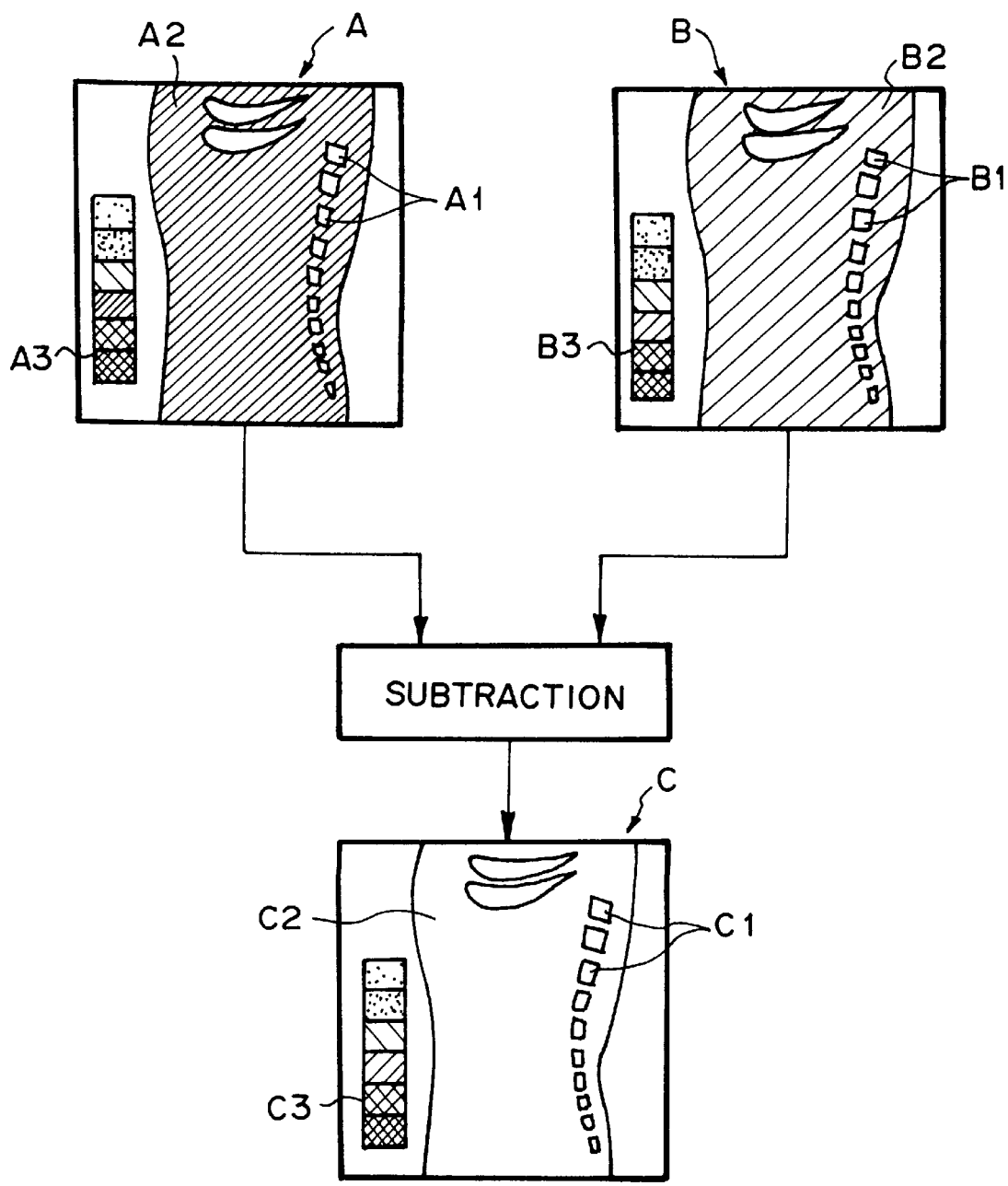
FIG. 3 is an explanatory view showing a high-energy image A, a low-energy image B, and a bone image C, which is formed by an energy subtraction processing means.

As illustrated in FIG. 1, a bone image processing apparatus 100 comprises an energy subtraction processing means 10, a bone density analyzing means 30, and a bone trabecula pattern emphasizing means 50. As illustrated in FIG. 3, the energy subtraction processing means 10 carries out energy subtraction processing on a high-energy image A (i.e., a radiation image recorded with radiation having a high energy level) and a low-energy image B (i.e., a radiation image recorded with radiation having a low energy level) of a single object, which comprises a soft tissue (represented by a pattern A2 or B2) and a bone tissue (represented by a pattern A1 or B1). The energy subtraction processing means 10 thereby forms a bone image C, in which a bone tissue pattern C1 has been emphasized. The bone density analyzing means 30 obtains numerical information concerning the density of the bone constituent in the bone tissue (represented by the bone tissue pattern C1) in accordance with a bone image signal (i.e., an energy subtraction image signal obtained from the energy subtraction processing) Ssub, which represents the bone image C. The bone trabecula pattern emphasizing means 50 carries out a bone trabecula pattern emphasizing process on the bone image signal Ssub.

In this embodiment, the high-energy image A and the low-energy image B have been obtained with a single recording operation in accordance with the so-called one-shot energy subtraction processing technique, which is described in, for example, U.S. Pat. No. 4,855,598. The single recording operation is carried out such that the high-energy image A and the low-energy image B may be formed respectively with two kinds of radiation having different energy distributions. In each of the high-energy image A and the low-energy image B, the pattern of the object and a pattern (A3, B3) of a bone mineral reference material 31, which is illustrated in FIG. 4, are recorded together with each other.

Figure 4:
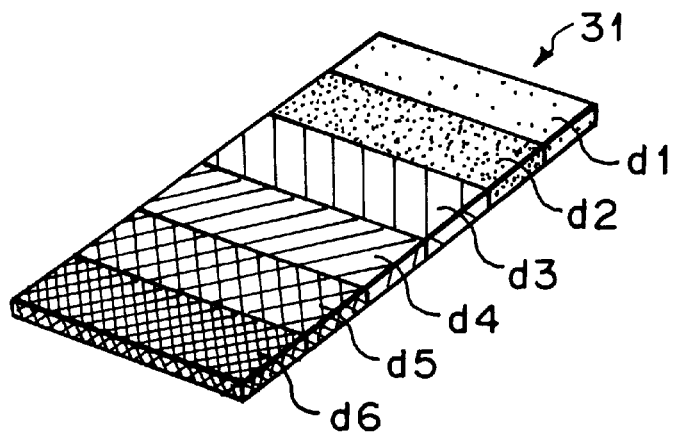
FIG. 4 is a perspective view showing an example of a bone mineral reference material.

As illustrated in FIG. 4, the bone mineral reference material 31 comprises different sections d1, d2, d3, d4, d5, and d6, in which the amount of the bone mineral, i.e. the content (% by weight) of $CaCO_3$, varies step-wise. The contents of $CaCO_3$ in all of the sections are known.

The energy subtraction processing means 10 weights a received high-energy image signal Sa, which represents the high-energy image A, and a received low-energy image signal Sb, which represents the low-energy image B, such that the image density of the soft tissue pattern B2 in the low-energy image B and the image density of the soft tissue pattern A2 in the high-energy image A may coincide with each other. Thereafter, the energy subtraction processing means 10 calculates the difference between the high-energy image signal Sa and the low-energy image signal Sb, which have been weighted, and thereby obtains the difference signal (i.e., the energy subtraction image signal) Ssub. As a result, the energy subtraction image signal Ssub represents the bone image, in which the bone tissue pattern C1 have been emphasized.

The bone density analyzing means 30 detects the levels of image density of the sections of a pattern C3, which represents the bone mineral reference material 31 and appears in the bone image C, the sections corresponding to the sections d1, d2, d3, d4, d5, and d6. Also, the bone density analyzing means 30 forms an image density-to-bone mineral amount conversion table illustrated in FIG. 5. The image density-to-bone mineral amount conversion table represents the levels of image density of the sections of the pattern C3 and the corresponding known bone mineral amounts of the sections d1, d2, d3, d4, d5, and d6. Further, the bone density analyzing means 30 detects the image density of the bone tissue pattern C1 appearing in the bone image C and converts the detected image density to the bone mineral amount in accordance with the image density-to-bone mineral amount conversion table. In this manner, the numerical information concerning the density of the bone constituent is obtained.

The bone trabecula pattern emphasizing means 50 emphasizes the pattern of the bone trabeculae in the bone tissue pattern C1 in the bone image C by carrying out skeleton processing in accordance with a morphology operation, which is represented by Formula (1) shown below.

$$Smor = \bigcup_{\lambda = n1}^{N} \left\{ \max_{i=1,\ldots,n} (Sorg \ominus \lambda Bi) - \max_{i=1,\ldots,n} (Sorg \ominus \lambda Bi)_B \right\} \tag{1}$$

wherein the expression $X \ominus \lambda Y$ represents $\lambda$ times of Minkowski difference operations (erosion processings) carried out with the structure element Y and on the image signal X, the expression $(X \ominus \lambda Y)_Y$, represents the opening processing carried out with the structure element Y and on the image signal $(X \ominus \lambda Y)$, and $$\bigcup_{\lambda = n1}^{N} \{\}$$

represents the union of sets of { } with $\lambda$=n1, n1+1, ..., N.

How the bone image processing apparatus 100 operates will be described hereinbelow.

The energy subtraction processing means 10 carries out the energy subtraction processing on the received high-energy image signal Sa, which represents the high-energy image A, and the received low-energy image signal Sb, which represents the low-energy image B. The bone image signal Ssub is thereby obtained. The energy subtraction processing is carried out with Formula (11) shown below.

$$Ssub = K \log Sa - L \log Sb + M \tag{11}$$

wherein K, L, and M represent coefficients.

The thus obtained bone image signal Ssub represents the bone image C, in which the soft tissue pattern (A2, B2) has been erased and the tone tissue pattern (A1, B1) has been emphasized.

Thereafter, the thus obtained bone image signal Ssub, which represents the bone image C, is fed into the bone density analyzing means 30. The bone density analyzing means 30 detects the levels of image density (image signal values) of the sections of the pattern C3, which represents the bone mineral reference material 31 and appears in the bone image C, the sections corresponding to the sections d1, d2, d3, d4, d5, and d6.

Figure 5:
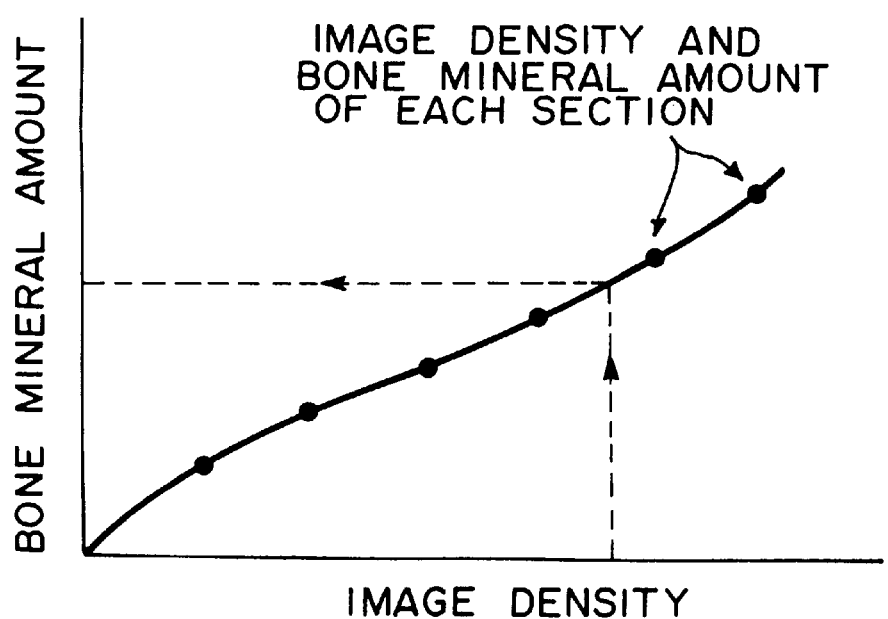
FIG. 5 is a graph showing an example of an image density-to-bone mineral amount conversion table, which is formed by a bone density analyzing means 30.
Figure 6A:
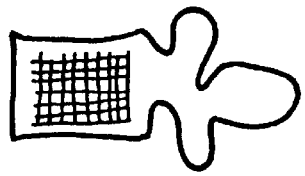
FIGS. 6A, 6B, 6C, 6D, and 6E are explanatory views showing patterns of bone trabeculae in radiation images (progress of osteoporosis)
Figure 6B:
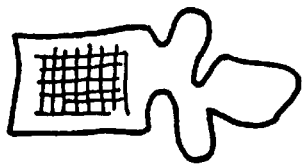
Figure 6C:
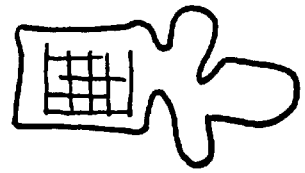
Figure 6D:
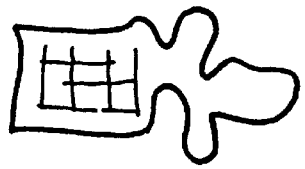
Figure 6E:
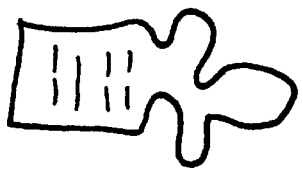
Figure 7A:
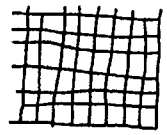
FIGS. 7A, 7B, 7C, 7D, and 7E are explanatory views showing patterns of bone trabeculae obtained from skeleton processing (progress of osteoporosis)
Figure 7B:
Figure 7C:
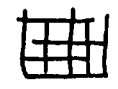
Figure 7D:
Figure 7E:
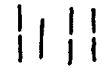

Also, the bone density analyzing means 30 forms the image density-to-bone mineral amount conversion table illustrated in FIG. 5. The image density-to-bone mineral amount conversion table represents the levels of image density of the sections of the pattern C3 and the corresponding known bone mineral amounts (amounts of $CaCO_3$) of the sections d1, d2, d3, d4, d5, and d6. Thereafter, the bone density analyzing means 30 converts the bone image signal Ssub to the bone mineral amounts in accordance with the image density-to-bone mineral amount conversion table and thereby obtains the numerical information concerning the density of the bone constituent in the bone tissue.

The thus obtained numerical information concerning the density of the bone constituent is fed into an output medium, such as a display device, and used in making a diagnosis.

The bone image signal Ssub, which represents the bone image C, is also fed into the bone trabecula pattern emphasizing means 50.

The bone trabecula pattern emphasizing means 50 carries out the skeleton processing in accordance with the morphology operation, which is represented by Formula (1) shown above, on the received bone image signal Ssub. The pattern of the bone trabeculae in the bone tissue pattern C1 in the bone image C is thereby emphasized. As the structure element employed in the morphology operation, a structure element having a size suitable for extracting the skeletons of the bone trabecula pattern (specifically, a size in accordance with the thickness of the bone trabecula pattern) is set.

The bone trabeculae are constituted of cancellous matter extending vertically and horizontally within a bone. As illustrated in FIGS. 6A through 6E, in a radiation image, the patterns of the cancellous matter extending vertically and horizontally appear as being superposed several times over. However, as illustrated in FIGS. 7A through 7E, from the skeleton processing in accordance with the morphology operation, which is carried out by the bone trabecula pattern emphasizing means 50, an image is obtained in which only the patterns of the skeletons of the cancellous matter are superposed several times over.

The image signal representing the image, in which only the patterns of the skeletons of the bone trabeculae have been extracted, is fed into an exterior displaying means, or the like.

As described above, with this embodiment of the bone image processing apparatus, the density of the bone constituent can be obtained quantitatively as the numerical information, and the condition of the bone trabeculae can be obtained as the image information which can be recognized visually. Therefore, this embodiment is markedly efficient for making a diagnosis of the condition of the bone trabeculae and can furnish the information useful for making a diagnosis of, particularly, osteoporosis.

In the embodiment of FIG. 1, the image information representing the bone trabeculae is obtained in the bone trabecula pattern emphasizing means 50. Also, as illustrated in the flow chart of FIG. 15, an index value representing the bone trabecula structure may be calculated in accordance with the image information representing the bone trabeculae, which information has been obtained in the bone trabecula pattern emphasizing means 50. The information representing the index value and the numerical information representing the bone density may then be fed into a judgment device. In the judgment device, a judgment may be made as to the condition of the bone tissue of the object. How the index value is calculated will be described hereinbelow.

Figure 16:
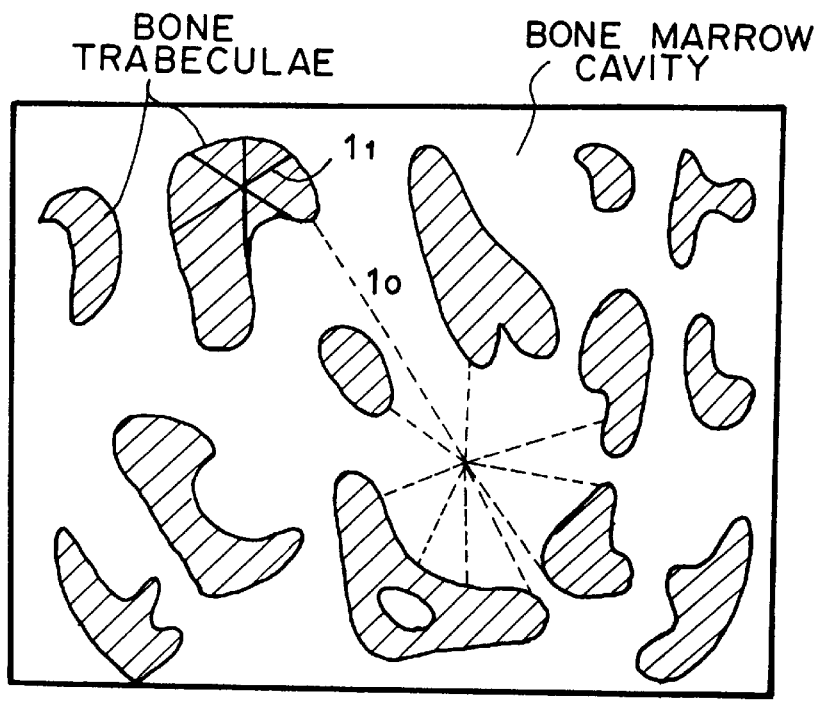
FIG. 16 is an explanatory view showing a star volume technique.

As an example of the techniques for calculating the index value representing the bone trabecula structure, a star volume technique may be employed. FIG. 16 is an explanatory view showing the star volume technique. In the star volume technique, marrow space star volume (Vm) and trabecular star volume (Vt) are defined. The marrow space star volume (Vm) represents the mean value of the values of the bone marrow cavity volume of the regions, each of which extends from a certain point in the bone marrow cavity along every direction without being obstructed by the bone trabeculae. The trabecular star volume (Vt) represents the mean value of the values of the volume of the regions, each of which extends from a certain point in the bone trabecula along every direction to the end of the bone trabecula. In FIG. 16, the hatched regions indicate the bone trabeculae, and the other region indicates the bone marrow cavity. The star volume is considered as being a gap-free stereological index, which represents the size of the bone trabecula in the bone marrow cavity as a three-dimensional value in units of mm$^3$ or $\mu$m$^3$ by elaborating the sampling technique. In cases where the continuity of the bone trabeculae is high, Vm takes a small value. In cases where the level of disappearance or porosity of the bone trabeculae is high, Vm takes a large value. Conversely, in cases where the continuity of the bone trabeculae is high, Vt takes a large value. In cases where the level of disappearance or porosity of the bone trabeculae is high, Vt takes a small value.

The value of Vmi at an arbitrary point i in the bone marrow cavity is defined by Formula (12) shown below.

$$Vmi=(\pi/3)\times \overline{l_0^3} \qquad (12)$$

wherein $l_0$ represents the length over which the bone marrow cavity is continuous along an arbitrary direction extending from the point i, and $\overline{l_0^3}$ represents the mean value of the values $l_0^3$ calculated with respect to all of radial directions extending from the point i.

The value of Vtj at an arbitrary point j in the bone trabecula is defined by Formula (13) shown below.

$$Vtj=(\pi/3)\times(\Sigma l_1^4/\Sigma l_1) \qquad (13)$$

wherein $l_1$ represents the length over which the bone trabecula is continuous along an arbitrary direction extending from the point j, the values of $l_1$ are calculated with respect to all of radial directions extending from the point j, and $\Sigma$ represents the calculation of the sum of the values with respect to all of the radial directions.

In this embodiment, Vmi is calculated for each sampling point, and the mean value of the Vmi values, which have been calculated for all of the sampling points, is taken as Vm. Also, Vtj is calculated for each sampling point, and the mean value of the Vtj values, which have been calculated for all of the sampling points, is taken as Vt.

As the index value representing the bone trabecula structure, either one of Vm and Vt may be employed. In this embodiment, Vt is employed as the index value representing the bone trabecula structure.

After the image information representing the bone trabeculae has been obtained, the value of Vt is calculated with Formula (13) shown above, and the information representing the value of Vt is fed into the judgment device together with the numerical information representing the bone density.

Figure 17:
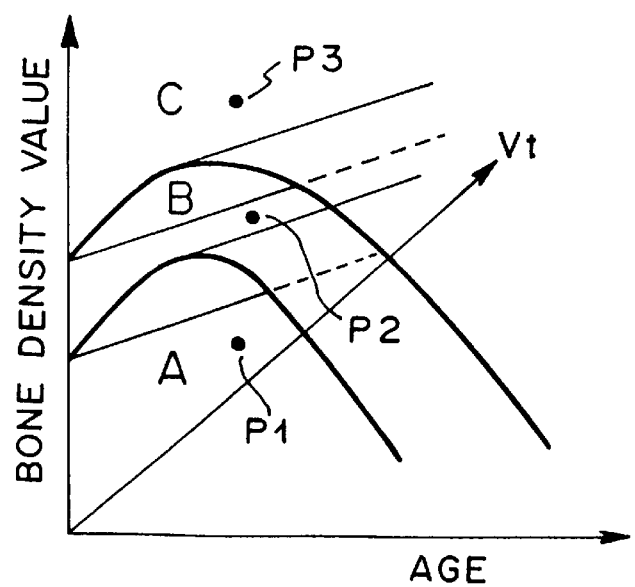
FIG. 17 is a graph showing an example of a technique for judging the condition of a bone tissue in an object.

For example, as illustrated in FIG. 17, the judgment device sets the three-dimensional coordinate system having the coordinate axes for the age of the object, the bone density value, and the value of Vt. A judgment as to the condition of the bone tissue is made in accordance with a position on the three-dimensional coordinate system, at which the received results are plotted. Specifically, in cases where the age of the object, the bone density value, and the value of Vt, which are presented to the judgment device, are located at a point P1, it is judged that the bone tissue is in the condition A. In cases where the age of the object, the bone density value, and the value of Vt, which are presented to the judgment device, are located at a point P2, it is judged that the bone tissue is in the condition B. Also, in cases where the age of the object, the bone density value, and the value of Vt, which are presented to the judgment device, are located at a point P3, it is judged that the bone tissue is in the condition C.

In this manner, in cases where the index value representing the bone trabecula structure is obtained in accordance with the image information representing the bone trabeculae, both of the density of the bone constituent and the condition of the bone trabeculae can be obtained quantitatively as the numerical information. Therefore, this embodiment is markedly efficient for making a diagnosis of the condition of the bone trabeculae and can furnish the information useful for making a diagnosis of, particularly, osteoporosis. Further, with this embodiment, the condition of the bone tissue of the object can be judged automatically.

Figure 15:
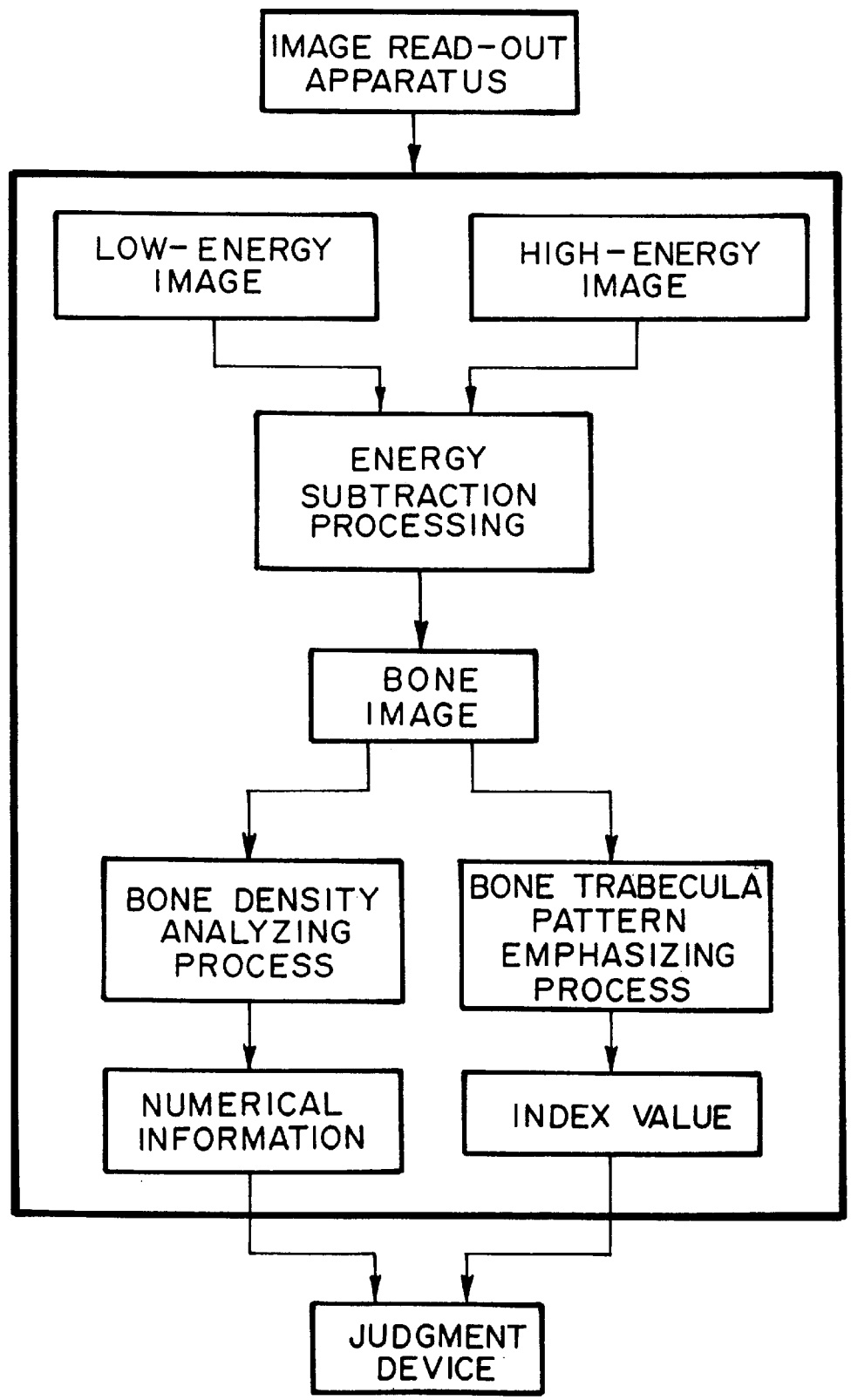
FIG. 15 is a flow chart showing how a still further different embodiment of the first bone image processing apparatus in accordance with the present invention operates.
Figures 18A, 18B:
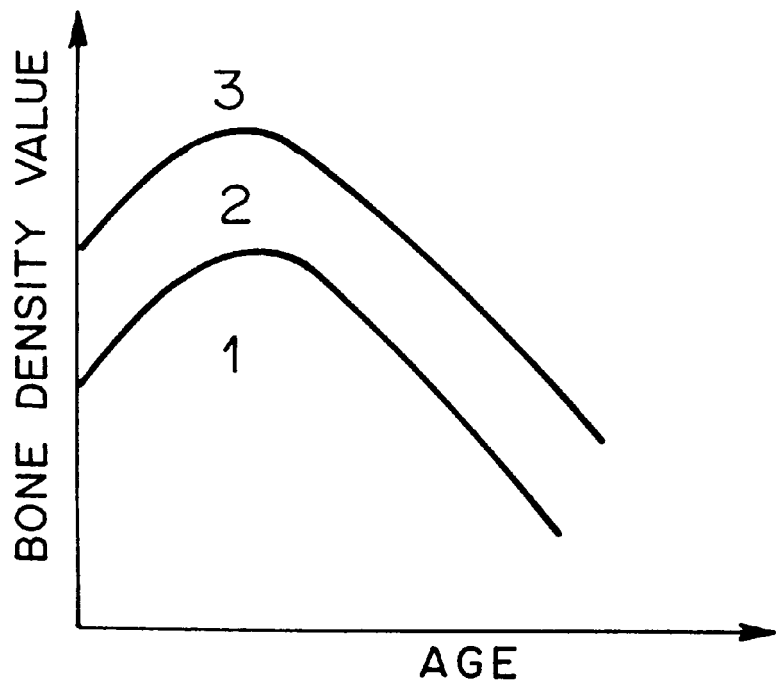
FIG. 18A is a graph showing a different example of a technique for judging the condition of a bone tissue in an object.
FIG. 18B is a diagram showing a table used in the technique of FIG. 18A.

In the embodiment of FIG. 15, as illustrated in FIG. 17, the three-dimensional coordinate system having the coordinate axes for the age of the object, the bone density value, and the value of Vt is formed, and a judgment as to the condition of the bone tissue of the object is thereby made. Alternatively, as illustrated in FIG. 18A, temporary judgments 1, 2, and 3 may be made in accordance with the age of the object and the bone density value. Thereafter, as illustrated in FIG. 18B, the condition of the bone tissue of the object may be judged by making reference to a table, which represents the relationship between the judgments 1, 2, 3 and the Vt values.

Also, in the embodiment of FIG. 15, Vt is employed as the index value. Alternatively, Vm described above may be employed as the index value. As another alternative, the index value may be calculated with node-strut analysis. The node-strut analysis is a technique for two-dimensionally rating the continuity of the bone trabeculae. Specifically, a connection point, at which three or more bone trabeculae are connected with one another, is defined as a node (Nd) (indicated by the white dot in FIG. 19), and a terminal point, at which the bone trabecula is not connected with other bone trabeculae, is defined as a terminus (Tm) (indicated by the black dot in FIG. 19). As illustrated in FIG. 19, the center lines (struts) of the bone trabeculae, which lines connect the points, are classified into NdNd (the strut connecting Nd and Nd with each other), NdTm (the strut connecting Nd and Tm with each other), TmTm (the strut connecting Tm and Tm with each other), CtNd (the strut connecting Ct, i.e. the cortical bone, and Nd with each other), and CtTm (the strut connecting Ct and Tm with each other). The lengths of the respective struts are measured. The parameters described below are defined in accordance with the lengths of the struts, the number of Nd, and the number of Tm.

(1) Length parameters

Ratios (%) of each strut to the sum (TSL) of lengths of all struts:

NdNd/TSL, NdTm/TSL, TmTm/TSL, CtNd/TSL, CtTm/TSL (2) Strut lengths per unit area (mm/mm$^2$)

TSL/TV, NdNd/TV, NdTm/TV, TmTm/TV, CtNd/TV, CtTm/TV (TV represents the total bone tissue area or the value of total bone tissue area—cortical bone area.)

(3) Number parameters

N. Nd/TV: Number of Nd per unit area (/mm$^2$)

N. Tm/TV: Number of Tm per unit area (/mm$^2$)

N. Nd/N. Tm: Ratio of the number of Nd to the number of Tm

With the definition described above, a large value of the Nd-related parameter indicates high continuity of the bone trabeculae. Also, a large value of the Tm-related parameter indicates low continuity of the bone trabeculae. The node-strut analysis is useful as a technique capable of directly and easily measuring the continuity of the bone trabeculae.

In the embodiment of FIG. 1, the bone trabecula pattern emphasizing means 50 carries out the bone trabecula pattern emphasizing process on the bone image signal Ssub and thereby obtains the image information representing the bone trabeculae. However, the first bone image processing apparatus in accordance with the present invention is not limited to this embodiment. For example, as illustrated in the flow chart of FIG. 8, the bone trabecula pattern emphasizing means 50 may carry out the bone trabecula pattern emphasizing process on the high-energy image signal Sa, which represents the high-energy image A, or the low-energy image signal Sb, which represents the low-energy image B. As another alternative, as illustrated in the flow chart of FIG. 9, the bone trabecula pattern emphasizing means 50 may carry out the bone trabecula pattern emphasizing process on an addition signal, which is obtained from a weighting addition process carried out the high-energy image signal Sa and the low-energy image signal Sb. The bone trabecula pattern emphasizing means 50 may thereby obtain the image information representing the bone trabeculae.

Figure 8:
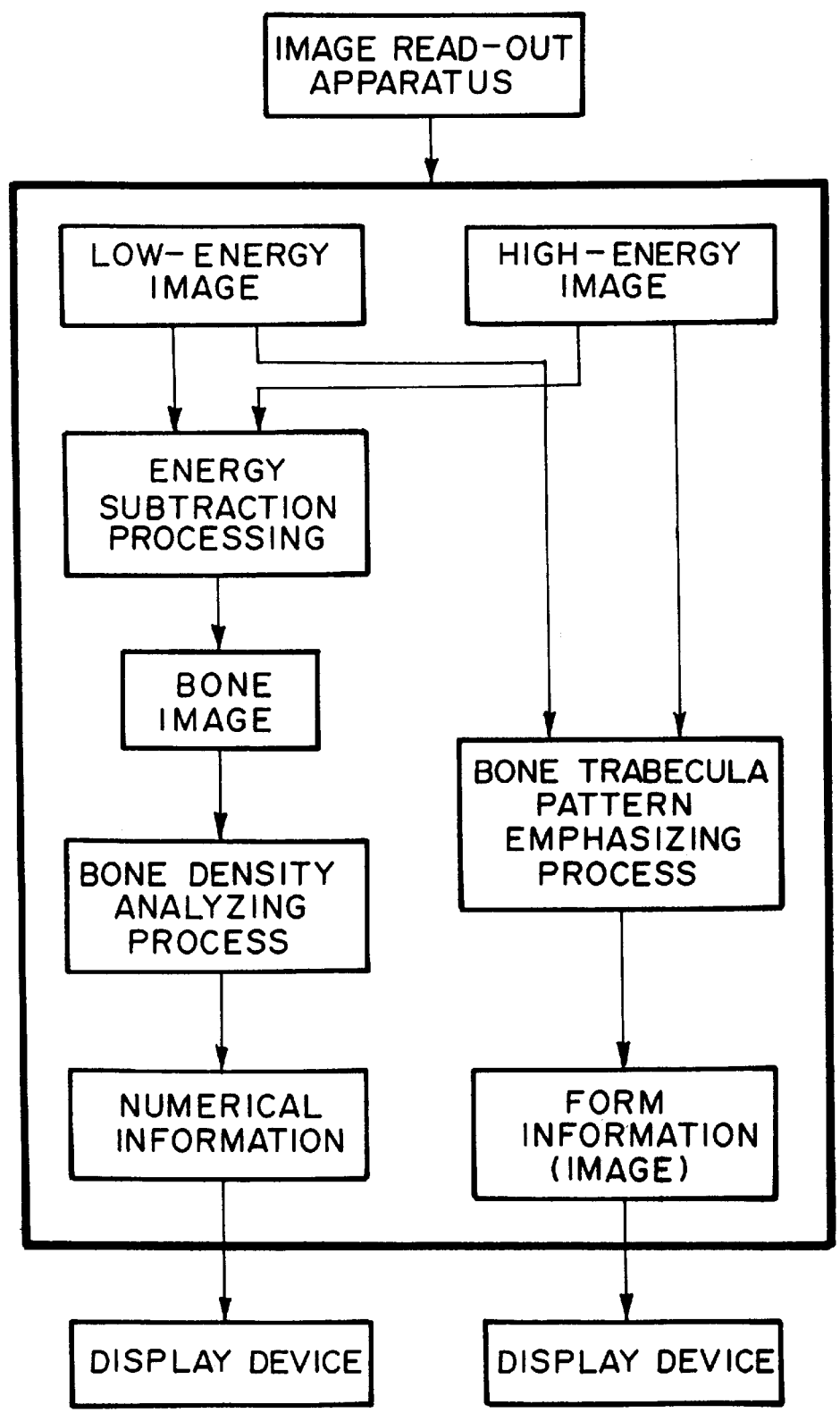
FIG. 8 is a flow chart showing how a different embodiment of the first bone image processing apparatus in accordance with the present invention operates.
Figure 10A:
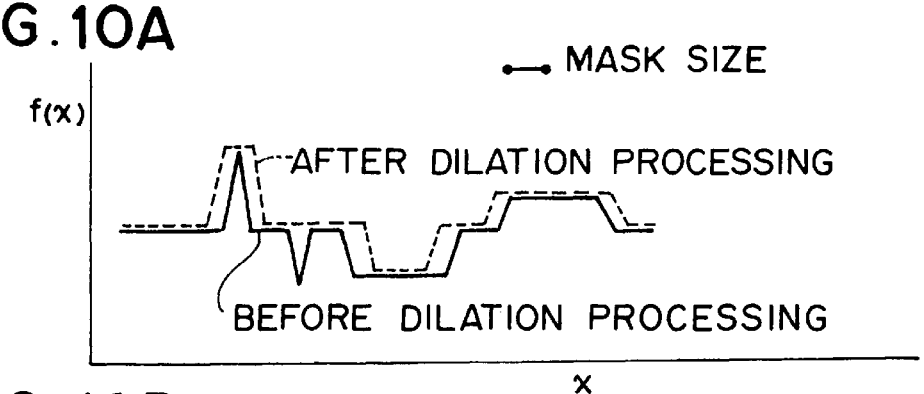
FIG. 10A is a graph showing how a dilation processing, which is one of fundamental morphology operations, is carried out.
Figure 10B:
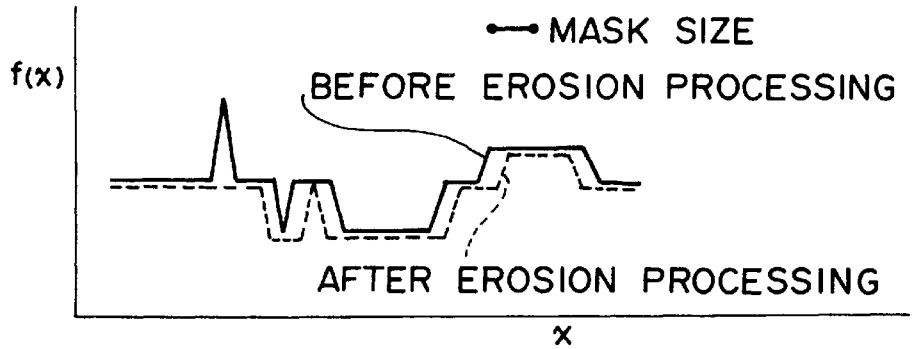
FIG. 10B is a graph showing how an erosion processing, which is one of fundamental morphology operations, is carried out.
Figure 10C:
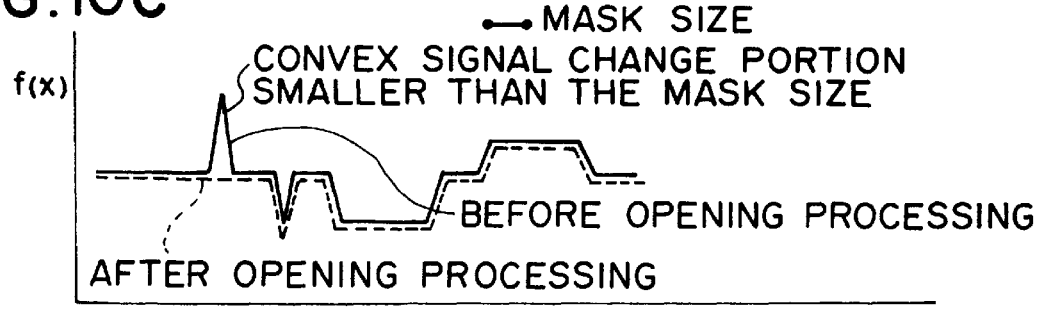
FIG. 10C is a graph showing how an opening processing, which is one of fundamental morphology operations, is carried out.
Figure 10D:
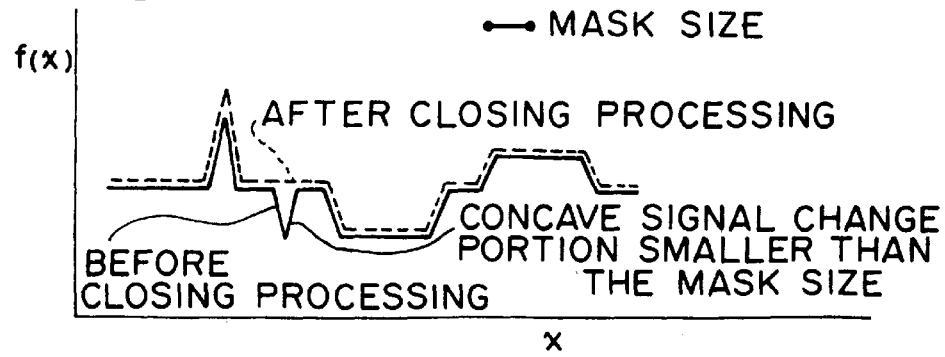
FIG. 10D is a graph showing how a closing processing, which is one of fundamental morphology operations, is carried out.
Figure 12A:
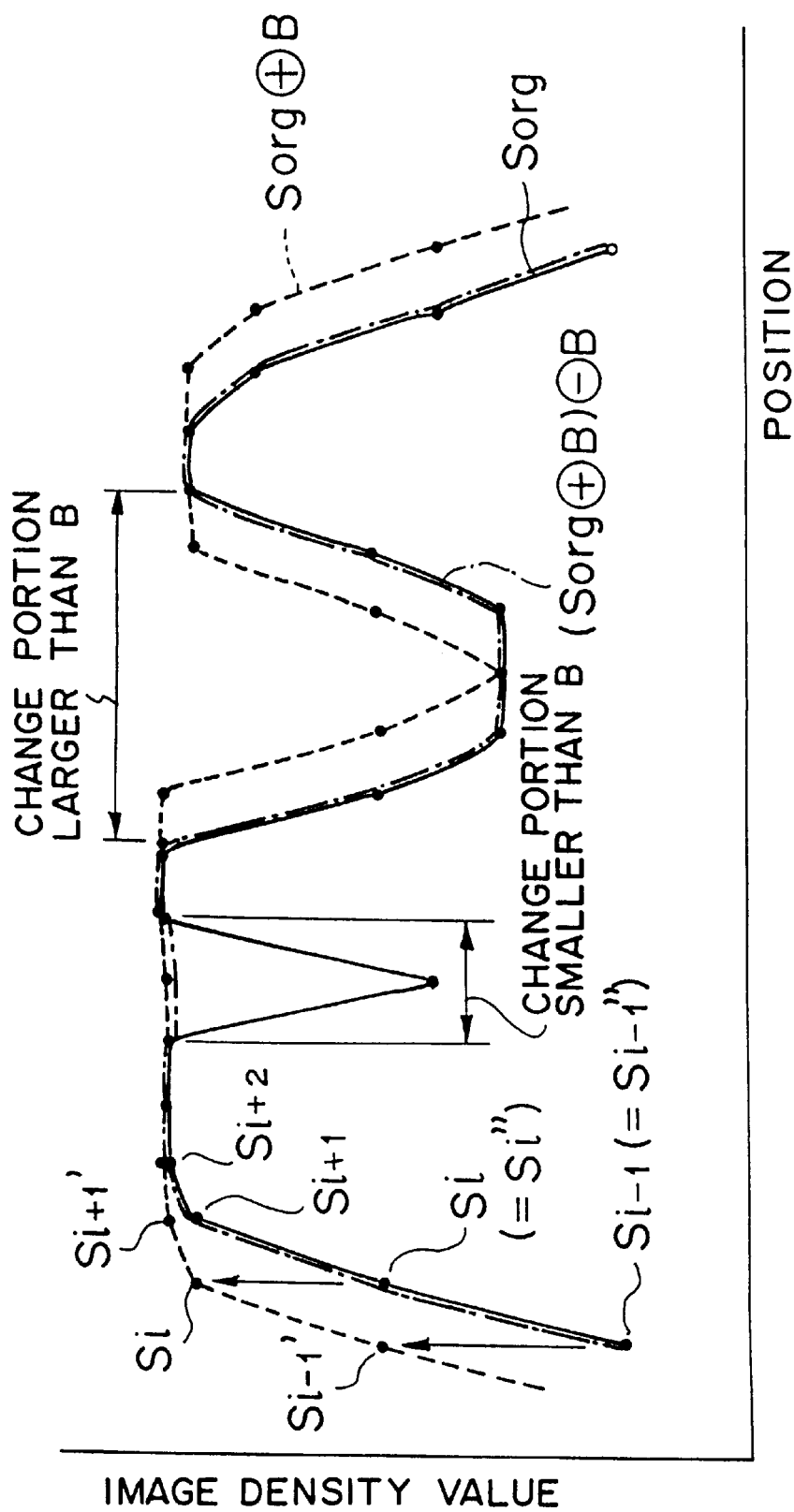
FIG. 12A is a graph showing a distribution of image density values, the graph serving as an aid in explaining how closing processing is carried out.
Figure 12B:
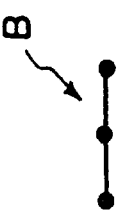
FIG. 12B is an explanatory view showing a linear structure element B, which is constituted of three picture elements.
Figure 14:
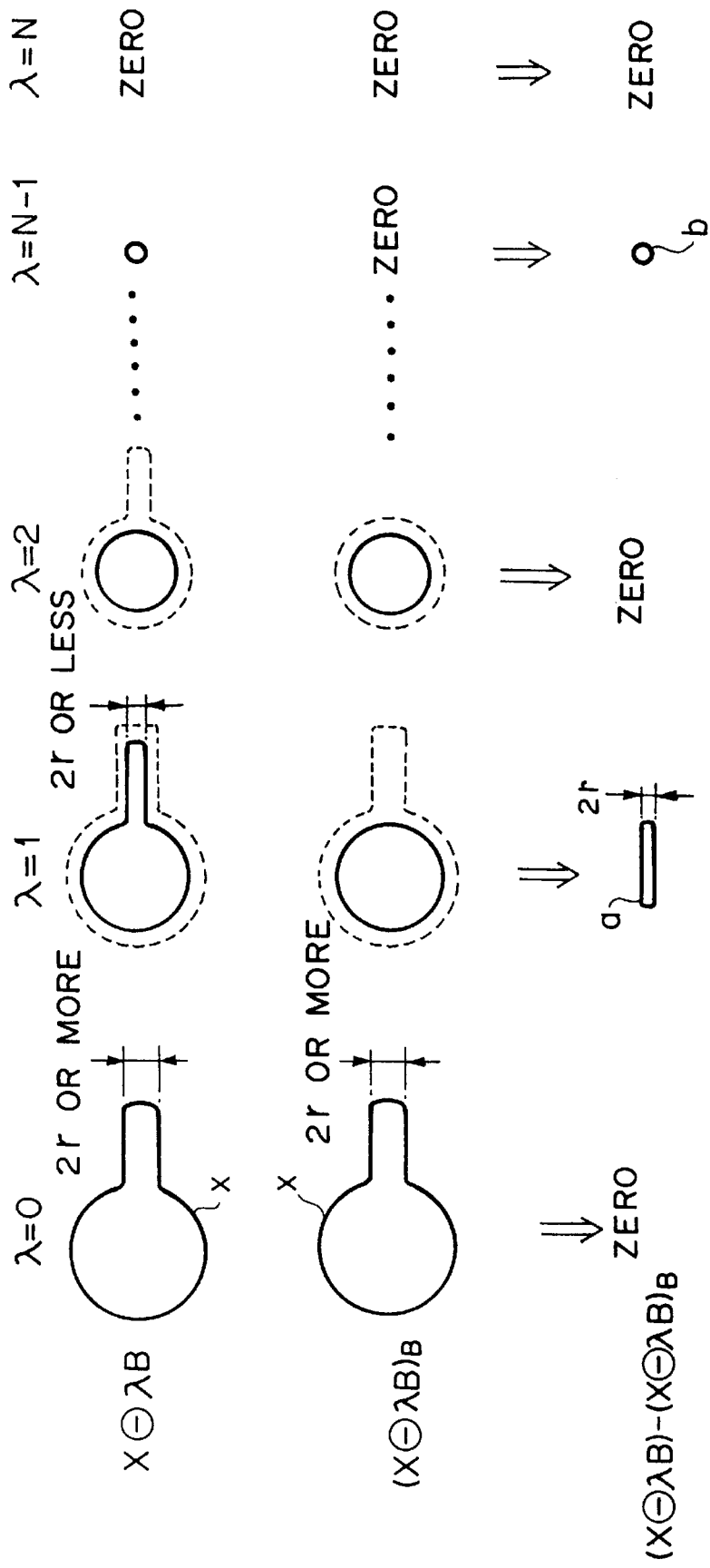
FIG. 14 is an explanatory view showing how skeleton processing is carried out.

In the embodiments of FIGS. 8 and 9, as in the embodiment of FIG. 15, the index value representing the bone trabecula structure may be calculated in accordance with the image information representing the bone trabeculae. Also, in the judgment device, a judgment may be made as to the condition of the bone tissue of the object in accordance with the calculated index value representing the bone trabecula structure and the numerical information representing the bone density.

The numerical information concerning the density of the bone constituent, which information has been obtained by the bone density analyzing means 30, and the information representing the form of bone trabeculae, which information has been obtained by the bone trabecula pattern emphasizing means 50, may be fed out into a single same output medium or into different output media.

Embodiments of the second bone image processing apparatus in accordance with the present invention will be described hereinbelow.

Figure 20:
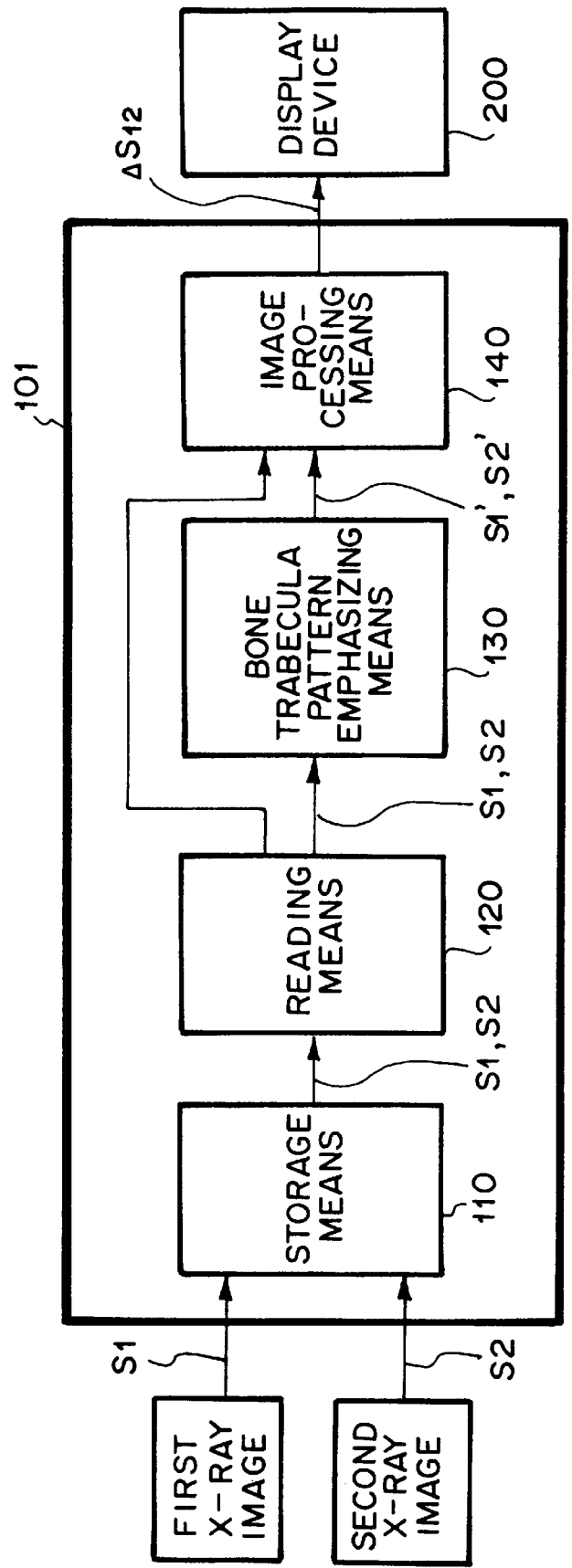
FIG. 20 is a block diagram showing a first embodiment of the second bone image processing apparatus in accordance with the present invention.
Figure 21:
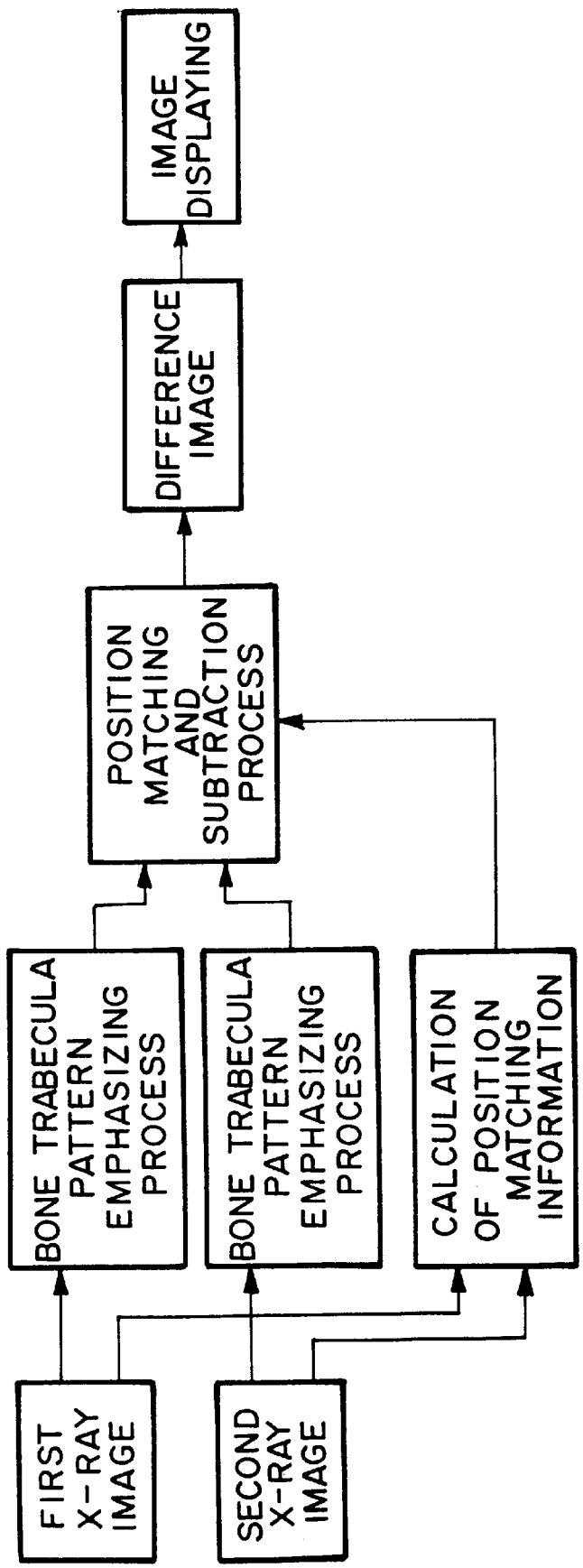
FIG. 21 is a flow chart showing how the embodiment of FIG. 20 operates.

FIG. 20 is a block diagram showing a first embodiment of the second bone image processing apparatus in accordance with the present invention. FIG. 21 is a flow chart showing how the embodiment of FIG. 20 operates. FIG. 22 is an explanatory view showing how a change of bone trabeculae with the passage of time is extracted in the embodiment of FIG. 20.

As illustrated in FIG. 20, a bone image processing apparatus 101 comprises a storage means 110, a reading means 120, a bone trabecula pattern emphasizing means 130, and an image processing means 140. The storage means 110 stores image signals representing a plurality of images of a single object, which comprises a soft tissue and a bone tissue, the plurality of the images of the single object having been recorded at different points of time. (In FIG. 22, A represents the soft tissue pattern, and B represents the bone tissue pattern.) The reading means 120 reads image signals (a first X-ray image signal S1 and a second X-ray image signal S2) representing two images (a first X-ray image P1 and a second X-ray image P2), which are to be used for comparison for finding a change of bone trabeculae with the passage of time, from the storage means 110. The bone trabecula pattern emphasizing means 130 carries out a bone trabecula pattern emphasizing process on each of the image signals S1 and S2 having been read from the storage means 110. The bone trabecula pattern emphasizing means 130 thereby emphasizes a bone trabecula pattern C in the bone tissue pattern B. The image processing means 140 carries out a position matching process on emphasized image signals S1' and S2', which have been obtained from the bone trabecula pattern emphasizing process, and the positions of the two images represented by the emphasized image signals S1' and S2' are thereby matched with each other. The image processing means 140 also carries out a subtraction process for subtracting the image signal components of the two emphasized image signals S1' and S2', which have been obtained from the position matching process, from each other, the image signal components representing corresponding picture elements in the two images. A difference signal representing a change of the bone trabeculae with the passage of time is thereby obtained.

As the bone trabecula pattern emphasizing means 130, by way of example, a skeleton processing means based upon a morphology operation may be employed. The skeleton processing means carries out skeleton processing in accordance with the morphology operation, which is represented by Formula (1) shown below.

$$Smor = \bigcup_{\lambda=n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression $X \ominus \lambda Y$ represents $\lambda$ times of Minkowski difference operations (erosion processings) carried out with the structure element Y and on the image signal X, the expression $(X \ominus \lambda Y)_Y$, represents the opening processing carried out with the structure element Y and on the image signal $(X \ominus \lambda Y)$, and $$\bigcup_{\lambda=n1}^{N} \{\}$$

represents the union of sets of { } with $\lambda$=n1, n1+1, . . . , N.

How the bone image processing apparatus 101 shown in FIG. 20 operates will be described hereinbelow.

The storage means 110 of the bone image processing apparatus 101 shown in FIG. 20 stores the image signals Si representing a plurality of X-ray images Pi of a single object, which have been recorded at different points of time.

By way of example, the image signal (the first X-ray image signal) S1 and the image signal (the second X-ray image signal) S2 representing the two images, which have been recorded at different points of time and are to be used for comparison, are specified by a person, who sees the images, such as a medical doctor or a radiation engineer. The reading means 120 reads the two specified image signals S1 and S2 from the storage means 110.

The first X-ray image signal S1 and the second X-ray image signal S2, which have been read from the storage means 110, are fed into the bone trabecula pattern emphasizing means 130. The bone trabecula pattern emphasizing means 130 carries out the skeleton processing in accordance with the morphology operation, which is represented by Formula (1) shown above, on the first X-ray image signal S1 and the second X-ray image signal S2 and thereby emphasizes the bone trabecula pattern C in the bone tissue pattern B in each of the images represented by the image signals S1 and S2. The size of the structure element, which is employed in the morphology operation, is set previously to be suitable for extracting the skeletons of the bone trabecula pattern.

The bone trabeculae are constituted of cancellous matter extending vertically and horizontally within a bone. In a radiation image, the patterns of the cancellous matter extending vertically and horizontally appear as being superposed several times over. However, as illustrated in FIG. 22, from the skeleton processing in accordance with the morphology operation, which is carried out by the bone trabecula pattern emphasizing means 130, an image is obtained in which only the patterns of the skeletons of the cancellous matter are superposed several times over. In a first X-ray image P1', which is represented by the first X-ray image signal Si' having been obtained from the bone trabecula pattern emphasizing process, and in a second X-ray image P2', which is represented by the second X-ray image signal S2' having been obtained from the bone trabecula pattern emphasizing process, the soft tissue pattern A has been erased substantially.

The first X-ray image signal S1' and the second X-ray image signal S2' representing the images, in which the bone trabecula pattern C has been emphasized, are fed into the image processing means 140.

The image processing means 140 receives the first X-ray image signal S1' and the second X-ray image signal S2' from the bone trabecula pattern emphasizing means 130. The image processing means 140 also receives the first X-ray image signal S1 and the second X-ray image signal S2, which have not passed through the bone trabecula pattern emphasizing means 130, from the reading means 120.

In the images Pi, which are represented by the image signals Si stored in the storage means 110, patterns D of markers, which serve as an index for matching the positions of two images with each other by the image processing means 140, are embedded. However, in the images, which are represented by the first X-ray image signal S1' and the second X-ray image signal S2' having been obtained from the bone trabecula pattern emphasizing process carried out by the bone trabecula pattern emphasizing means 130, the marker patterns D have been erased. Therefore, the image processing means 140 calculates information for the position matching (i.e., position matching information) in accordance with the positions of the marker patterns D in the images, which are represented by the first X-ray image signal S1 and the second X-ray image signal S2 having not passed through the bone trabecula pattern emphasizing means 130. The image processing means 140 carries out the position matching process on the first X-ray image signal S1' and the second X-ray image signal S2', and in accordance with the calculated position matching information.

Further, the image processing means 140 carries out the subtraction process for subtracting the image signal components of the first X-ray image signal S1' and the second X-ray image signal S2', which have been obtained from the position matching process, from each other, the image signal components representing corresponding picture elements in the two images. A difference signal $\Delta S_{12}$ representing a change of the bone trabeculae with the passage of time is thereby obtained.

The thus obtained difference signal $\Delta S_{12}$ is fed from the bone image processing apparatus 101 into an image output device, such as an image display device 200. The image display device 200 reproduces a visible image from the difference signal $\Delta S_{12}$ and displays the visible image, which illustrates a change of the bone trabeculae with the passage of time.

As described above, in this embodiment, the bone trabecula pattern emphasizing process is carried out on each of the first X-ray image signal S1 and the second X-ray image signal S2 representing the original images. In this manner, it is possible to reduce the adverse effects of a difference in beam hardening that are given to the pattern of the bone trabeculae due to, for example, a change in thickness of the soft tissue between the two different points of time, at which the original images are recorded, and the adverse effects of an artifact of the soft tissue due to a shift in position of the soft tissue occurring when the orientation of the object varies between the two different points of time, at which the original images are recorded. The subtraction process is carried out on the images, in which the artifacts have been reduced. Therefore, the visible image displayed in the manner described above is free from the adverse effects of the soft tissue.

The thus obtained image is the one represented by the image signal $\Delta S_{12}$, which represents a change of the bone trabeculae with the passage of time. Therefore, in cases where a visible image is reproduced from the image signal $\Delta S_{12}$ and on a recording medium, such as photographic film, or on a displaying means, such as a CRT display device, the change of the bone trabeculae with the passage of time can be displayed without being adversely affected by the soft tissue. Therefore, an image can be obtained, which has good image quality and can serve as an effective tool in the efficient and accurate diagnosis.

In the embodiment of FIG. 20, the skeleton processing means in accordance with the morphology operation is employed as the bone trabecula pattern emphasizing means 130. However, the second bone image processing apparatus in accordance with the present invention is not limited to this embodiment, and one of various other means capable of emphasizing the bone trabecula pattern can also be employed.

Also, the position matching process carried out by the image processing means 140 is not limited to the process utilizing the markers, and one of various other known techniques may be employed. For example, the position matching process utilizing two-dimensional non-linear image deformation may be employed, which is described in, for example, Medical Imaging Technology, Vol. 11, No. 3, July 1993, pp. 373–374.

FIG. 23 is a block diagram showing a second embodiment of the second bone image processing apparatus in accordance with the present invention. The second embodiment of FIG. 23 is the same as the first embodiment of FIG. 20, except that a smoothing means 150 is located between the bone trabecula pattern emphasizing means 130 and the image processing means 140. Also, in the embodiment of FIG. 23, as the image signals to be processed, in lieu of the original image signals (i.e., the first X-ray image signal S1 and the second X-ray image signal S2), image signals having been obtained from the energy subtraction processing (i.e., a first energy subtraction image signal and a second energy subtraction image signal) are employed. The energy subtraction processing is described in, for example, U.S. Pat. No. 4,855,598.

In the second embodiment of FIG. 23, wherein the energy subtraction image signals are employed for the processing, the soft tissue patterns can be erased to a certain extent. Therefore, an image signal representing a change of the bone trabeculae with the passage of time can be obtained such that the adverse effects of an artifact due to the soft tissue, or the like, may be reduced even further.

Also, in the smoothing means 150, the smoothing process is carried out on the image signals, which have been obtained from the bone trabecula pattern emphasizing process carried out by the bone trabecula pattern emphasizing means 130 and represent the patterns C of the bone trabeculae at the respective points of time at which the images are recorded. Therefore, it is possible to reduce the adverse effects of an artifact of the bone trabecula pattern due to a shift in position of the bone tissue occurring when the orientation of the object varies between the two different points of time, at which the images are recorded. In the image processing means 140, the subtraction process is carried out on the bone trabecula pattern emphasized images, in which such an artifact has been reduced. Accordingly, an image signal representing the change of the bone trabeculae with the passage of time can be obtained, such that it may have better image quality and can serve as a more effective tool in the efficient and accurate diagnosis than in the first embodiment of FIG. 20.

As the smoothing process carried out by the smoothing means 150, one of various known techniques, such as an unsharp mask processing (spatial filtering with a matrix), may be employed. Such a technique may also be employed in the first embodiment of FIG. 20.

In the second embodiment of FIG. 23, the image signals stored in the storage means 110 are the energy subtraction image signals, which have been obtained from the energy subtraction processing. Alternatively, as in a third embodiment of the second bone image processing apparatus in accordance with the present invention, which is illustrated in FIG. 24, high-energy image signals and low-energy image signals before being subjected to the energy subtraction processing may be stored in the storage means 110 and utilized for the processing.

In the third embodiment of FIG. 24, the bone trabecula pattern emphasizing process, the smoothing process, the position matching process, and the subtraction process are carried out on the energy subtraction image signals. However, since the image signals stored in the storage means 110 are the image signals before being subjected to the energy subtraction processing, the third embodiment also comprises an energy subtraction processing means 160, besides the means constituting the second embodiment of FIG. 23. The energy subtraction processing means 160 calculates the energy subtraction image signal with respect to each point of time of image recording in accordance with the high-energy image and the low-energy image, which have been recorded at each point of time. In this manner, two energy subtraction image signals are calculated with respect to two different points of time, at which the images are recorded. The bone trabecula pattern emphasizing process, the smoothing process, the position matching process, and the subtraction process are carried out on the thus calculated energy subtraction image signals. The other configuration, operations, and effects are the same as those in the second embodiment of FIG. 23.

What is claimed is:

1. A bone image processing method wherein two radiation images of a single object, which comprises a soft tissue and a bone tissue, are formed respectively with two kinds of radiation having different energy distributions, the two radiation images being to be subjected to energy subtraction processing, and information concerning the density of a bone constituent in the bone tissue is obtained from the two radiation images, the method comprising the steps of:

i) carrying out the energy subtraction processing on the two radiation images, a bone image, in which the pattern of the bone tissue in the object has been extracted or emphasized, being thereby formed, ii) obtaining numerical information concerning the density of the bone constituent in accordance with said bone image, and iii) carrying out a bone trabecula pattern emphasizing process on said bone image, information representing the form of bone trabeculae being thereby obtained.

2. A method as defined in claim 1 wherein an index value representing a bone trabecula structure is calculated in accordance with said information representing the form of bone trabeculae.

3. A method as defined in claim 2 wherein the condition of the bone tissue of the object is judged in accordance with said numerical information concerning the density of the bone constituent and said index value representing the bone trabecula structure.

4. A method as defined in claim 1 wherein said bone trabecula pattern emphasizing process is skeleton processing in accordance with a morphology operation, which skeleton processing may be represented by Formula (1) shown below, and the image subjected to said morphology operation is represented by a high image density-high signal level type of image signal:

$$Smor = \bigcup_{\lambda=n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression $X \ominus \lambda Y$ represents $\lambda$ times of Minkowski difference operations (erosion processings) carried out with the structure element Y and on the image signal X, the expression $(X \ominus \lambda Y)_Y$ represents the opening processing carried out with the structure element Y and on the image signal $(X \ominus \lambda Y)$, and $$\bigcup_{\lambda=n1}^{N} \{\}$$

represents the union of sets of { } with $\lambda$=n1, n1+1, . . . , N.

5. A method as defined in claim 4 wherein the value of n1 in Formula (1) is at least 2.

6. A method as defined in claim 1 wherein said bone trabecula pattern emphasizing process is skeleton processing in accordance with a morphology operation, which skeleton processing may be represented by Formula (2) shown below, and the image subjected to said morphology operation is represented by a high luminance-high signal level type of image signal:

$$Smor = \bigcup_{\lambda=n1}^{N} \left\{ \min_{i=1,\ldots,n} (Sorg \oplus \lambda Bi) - \min_{i=1,\ldots,n} (Sorg \oplus \lambda Bi)^B \right\} \quad (2)$$

wherein the expression $X \oplus \lambda Y$ represents $\lambda$ times of Minkowski sum operations (dilation processings) carried out with the structure element Y and on the image signal X, the expression $(X \oplus \lambda Y)^Y$ represents the closing processing carried out with the structure element Y and on the image signal $(X \oplus \lambda Y)$, and $$\bigcup_{\lambda=n1}^{N} \{\}$$

represents the union of sets of { } with $\lambda$=n1, n1+1, . . . , N.

7. A method as defined in claim 6 wherein the value of n1 in Formula (2) is at least 2.

8. A method as defined in claim 1 wherein said numerical information concerning the density of the bone constituent is obtained by:

forming the two radiation images of the single object such that a pattern of a bone mineral reference material, in which the amounts of a bone mineral are known, may be embedded together with the pattern of the object in each of the two radiation images, forming an image density-to-bone mineral amount conversion table from the image density of the pattern of said bone mineral reference material, which pattern appears in said bone image, and said known amounts of the bone mineral, and converting the image density of the pattern of the bone tissue, which pattern appears in said bone image of the object, to the amount of the bone mineral in accordance with said image density-to-bone mineral amount conversion table.

9. A bone image processing method, wherein two radiation images of a single object, which comprises a soft tissue and a bone tissue, are formed respectively with two kinds of radiation having different energy distributions, the two radiation images being to be subjected to energy subtraction processing, and information concerning the density of a bone constituent in the bone tissue is obtained from the two radiation images, the method comprising the steps of:

i) carrying out the energy subtraction processing on the two radiation images, a bone image, in which the pattern of the bone tissue in the object has been extracted or emphasized, being thereby formed, ii) obtaining numerical information concerning the density of the bone constituent in accordance with said bone image, and iii) carrying out a bone trabecula pattern emphasizing process on at least either one of the two radiation images or on an addition image represented by an addition image signal, information representing the form of bone trabeculae being thereby obtained, said addition image signal being obtained by weighting image signal components of each of radiation image signals representing the two radiation images and by adding the weighted image signal components of the radiation image signals to each other, which image signal components represent corresponding picture elements in the two radiation images.

10. A method as defined in claim 9 wherein an index value representing a bone trabecula structure is calculated in accordance with said information representing the form of bone trabeculae.

11. A method as defined in claim 10 wherein the condition of the bone tissue of the object is judged in accordance with said numerical information concerning the density of the bone constituent and said index value representing the bone trabecula structure.

12. A method as defined in claim 9 wherein said bone trabecula pattern emphasizing process is skeleton processing in accordance with a morphology operation, which skeleton processing may be represented by Formula (1) shown below, and the image subjected to said morphology operation is represented by a high image density-high signal level type of image signal:

$$Smor = \bigcup_{\lambda=n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression X⊖λY represents λ times of Minkowski difference operations (erosion processings) carried out with the structure element Y and on the image signal X, the expression $(X \ominus \lambda Y)_Y$ represents the opening processing carried out with the structure element Y and on the image signal (X⊖λY), and $$\bigcup_{\lambda=n1}^{N} \{\}$$

represents the union of sets of { } with λ=n1, n1+1, ..., N.

13. A method as defined in claim 12 wherein the value of n1 in Formula (1) is at least 2.

14. A method as defined in claim 9 wherein said bone trabecula pattern emphasizing process is skeleton processing in accordance with a morphology operation, which skeleton processing may be represented by Formula (2) shown below, and the image subjected to said morphology operation is represented by a high luminance-high signal level type of image signal:

$$Smor = \bigcup_{\lambda=n1}^{N} \left\{ \min_{i=1,\ldots,n} (Sorg \oplus \lambda Bi) - \min_{i=1,\ldots,n} (Sorg \oplus \lambda Bi)^B \right\} \quad (2)$$

wherein the expression X⊕λY represents λ times of Minkowski sum operations (dilation processings) carried out with the structure element Y and on the image signal X, the expression $(X \oplus \lambda Y)^Y$ represents the closing processing carried out with the structure element Y and on the image signal (X⊕λY), and $$\bigcup_{\lambda=n1}^{N} \{\}$$

represents the union of sets of { } with λ=n1, n1+1, ..., N.

15. A method as defined in claim 14 wherein the value of n1 in Formula (2) is at least 2.

16. A method as defined in claim 9 wherein said numerical information concerning the density of the bone constituent is obtained by:

forming the two radiation images of the single object such that a pattern of a bone mineral reference material, in which the amounts of a bone mineral are known, may be embedded together with the pattern of the object in each of the two radiation images, forming an image density-to-bone mineral amount conversion table from the image density of the pattern of said bone mineral reference material, which pattern appears in said bone image, and said known amounts of the bone mineral, and converting the image density of the pattern of the bone tissue, which pattern appears in said bone image of the object, to the amount of the bone mineral in accordance with said image density-to-bone mineral amount conversion table.

17. A bone image processing apparatus, wherein two radiation images of a single object, which comprises a soft tissue and a bone tissue, are formed respectively with two kinds of radiation having different energy distributions, the two radiation images being to be subjected to energy subtraction processing, and information concerning the density of a bone constituent in the bone tissue is obtained from the two radiation images, the apparatus comprising:

i) an energy subtraction processing means for carrying out the energy subtraction processing on two predetermined image signals, a bone image signal representing a bone image, in which a desired bone tissue pattern embedded in the images represented by the image signals has been extracted or emphasized, being thereby obtained, ii) a bone density analyzing means for obtaining numerical information concerning the density of the bone constituent in accordance with said bone image signal, and iii) a bone trabecula pattern emphasizing means for carrying out a bone trabecula pattern emphasizing process on at least either one of the radiation image signals representing the two radiation images before being subjected to the energy subtraction processing, on an addition image signal representing an addition image, or on said bone image signal having been obtained from the energy subtraction processing, said addition image signal being obtained by weighting image signal components of each of the radiation image signals representing the two radiation images and by adding the weighted image signal components of the radiation image signals to each other, which image signal components represent corresponding picture elements in the two radiation images.

18. An apparatus as defined in claim 17 wherein the apparatus further comprises an index value calculating means for calculating an index value, which represents a bone trabecula structure, in accordance with information representing the form of bone trabeculae, the pattern of which has been emphasized by said bone trabecula pattern emphasizing means.

19. An apparatus as defined in claim 18 wherein the apparatus still further comprises a judgment means for making a judgment as to the condition of the bone tissue of the object in accordance with said numerical information concerning the density of the bone constituent and said index value representing the bone trabecula structure.

20. An apparatus as defined in claim 17 wherein said bone trabecula pattern emphasizing means is a morphology operation means for carrying out skeleton processing in accordance with a morphology operation, which skeleton processing may be represented by Formula (1) shown below, and the image signal subjected to said morphology operation is represented by a high image density-high signal level type of image signal:

$$Smor = \bigcup_{\lambda=n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression X⊖λY represents λ times of Minkowski difference operations (erosion processings)

carried out with the structure element Y and on the image signal X, the expression $(X \ominus \lambda Y)_Y$ represents the opening processing carried out with the structure element Y and on the image signal $(X \ominus \lambda Y)$, and $$\bigcup_{\lambda=n1}^{N} \{\}$$

represents the union of sets of { } with $\lambda$=n1, n1+1, ..., N.

21. An apparatus as defined in claim 20 wherein the value of n1 in Formula (1) is at least 2.

22. An apparatus as defined in claim 17 wherein said bone trabecula pattern emphasizing means is a morphology operation means for carrying out skeleton processing in accordance with a morphology operation, which skeleton processing may be represented by Formula (2) shown below, and the image signal subjected to said morphology operation is represented by a high luminance-high signal level type of image signal:

$$Smor = \bigcup_{\lambda=n1}^{N} \left\{ \min_{i=1,\dots,n}(Sorg \oplus \lambda Bi) - \min_{i=1,\dots,n}(Sorg \oplus \lambda Bi)^B \right\} \quad (2)$$

wherein the expression $X \oplus \lambda Y$ represents $\lambda$ times of Minkowski sum operations (dilation processings) carried out with the structure element Y and on the image signal X, the expression $(X \oplus \lambda Y)^Y$ represents the closing processing carried out with the structure element Y and on the image signal $(X \oplus \lambda Y)$, and $$\bigcup_{\lambda=n1}^{N} \{\}$$

represents the union of sets of { } with $\lambda$=n1, n1+1, ..., N.

23. An apparatus as defined in claim 22 wherein the value of n1 in Formula (2) is at least 2.

24. An apparatus as defined in claim 17 wherein the two radiation images of the single object are formed such that a pattern of a bone mineral reference material, in which the amounts of a bone mineral are known, may be embedded together with the pattern of the object in each of the two radiation images, and said bone density analyzing means obtains said numerical information concerning the density of the bone constituent by:

forming an image density-to-bone mineral amount conversion table from the image density of the pattern of said bone mineral reference material, which pattern appears in said bone image, and said known amounts of the bone mineral, and converting the image density of the pattern of the bone tissue, which pattern appears in said bone image of the object, to the amount of the bone mineral in accordance with said image density-to-bone mineral amount conversion table.

25. A bone image processing method, comprising the steps of:

i) reading image signals representing two images, which are to be used for comparison, from an image storage means for storing image signals representing a plurality of images of a single object, which comprises a soft tissue and a bone tissue, the plurality of the images of the single object having been recorded at different points of time, ii) carrying out a bone trabecula pattern emphasizing process on each of the image signals having been read from said image storage means, the pattern of the bone trabeculae in the bone tissue being thereby emphasized, iii) carrying out a position matching process on the emphasized image signals, which have been obtained from said bone trabecula pattern emphasizing process, the positions of the two images represented by said emphasized image signals being thereby matched with each other, and iv) carrying out a subtraction process for subtracting the image signal components of said two emphasized image signals, which have been obtained from said position matching process, from each other, said image signal components representing corresponding picture elements in the two images, a difference signal representing a change of the bone trabeculae with the passage of time being thereby obtained.

26. A method as defined in claim 25 wherein the image signal, which represents the image of the single object having been recorded at each point of time, comprises two image signals representing two images of the single object, which images have been recorded for energy subtraction processing and at each point of time and have been formed respectively with two kinds of radiation having different energy distributions, before said bone trabecula pattern emphasizing process is carried out, energy subtraction processing for extracting a pattern of the bone tissue is carried out on said two image signals representing the two images of the single object, which images have been recorded for energy subtraction processing and at each point of time, a bone image signal being thereby obtained, and said bone trabecula pattern emphasizing process, said position matching process, and said subtraction process are carried out on the bone image signals, which have thus been obtained from two different sets of images having been recorded at two different points of time.

27. A method as defined in claim 25 wherein a smoothing process is carried out on each of said emphasized image signals, which are to be subjected to said position matching process, and at a stage after said bone trabecula pattern emphasizing process but before said position matching process, and said position matching process and said subtraction process are carried out on the image signals, which have been obtained from said smoothing process.

28. A method as defined in claim 25 wherein said bone trabecula pattern emphasizing process is skeleton processing in accordance with a morphology operation, which skeleton processing may be represented by Formula (1) shown below, and the image subjected to said morphology operation is represented by a high image density-high signal level type of image signal:

$$Smor = \bigcup_{\lambda = n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression $X \ominus \lambda Y$ represents $\lambda$ times of Minkowski difference operations (erosion processings) carried out with the structure element Y and on the image signal X, the expression $(X \ominus \lambda Y)_Y$ represents the opening processing carried out with the structure element Y and on the image signal $(X \ominus \lambda Y)$, and $$\bigcup_{\lambda = n1}^{N} \{\}$$

represents the union of sets of { } with $\lambda$=n1, n1+1, ..., N.

29. A method as defined in claim 28 wherein the value of n1 in Formula (1) is at least 2.

30. A method as defined in claim 25 wherein said bone trabecula pattern emphasizing process is skeleton processing in accordance with a morphology operation, which skeleton processing may be represented by Formula (2) shown below, and the image subjected to said morphology operation is represented by a high luminance-high signal level type of image signal:

$$Smor = \bigcup_{\lambda = n1}^{N} \left\{ \min_{i=1,\ldots,n} (Sorg \oplus \lambda Bi) - \min_{i=1,\ldots,n} (Sorg \oplus \lambda Bi)^B \right\} \quad (2)$$

wherein the expression $X \oplus \lambda Y$ represents $\lambda$ times of Minkowski sum operations (dilation processings) carried out with the structure element Y and on the image signal X, the expression $(X \oplus \lambda Y)^Y$ represents the closing processing carried out with the structure element Y and on the image signal $(X \oplus \lambda Y)$, and $$\bigcup_{\lambda = n1}^{N} \{\}$$

represents the union of sets of { } with $\lambda$=n1, n1+1, ..., N.

31. A method as defined in claim 30 wherein the value of n1 in Formula (2) is at least 2.

32. A bone image processing apparatus, comprising:
   i) a storage means for storing image signals representing a plurality of images of a single object, which comprises a soft tissue and a bone tissue, the plurality of the images of the single object having been recorded at different points of time,
   ii) a reading means for reading image signals representing two images, which are to be used for comparison, from said storage means,
   iii) a bone trabecula pattern emphasizing means for carrying out a bone trabecula pattern emphasizing process on each of the image signals having been read from said storage means, and thereby emphasizing the pattern of the bone trabeculae in the bone tissue, and
   iv) an image processing means for:
      carrying out a position matching process on the emphasized image signals, which have been obtained from said bone trabecula pattern emphasizing process, the positions of the two images represented by said emphasized image signals being thereby matched with each other, and
      carrying out a subtraction process for subtracting the image signal components of said two emphasized image signals, which have been obtained from said position matching process, from each other, said image signal components representing corresponding picture elements in the two images, a difference signal representing a change of the bone trabeculae with the passage of time being thereby obtained.

33. An apparatus as defined in claim 32 wherein the image signal, which represents the image of the single object having been recorded at each point of time, comprises two image signals representing two images of the single object, which images have been recorded for energy subtraction processing and at each point of time and have been formed respectively with two kinds of radiation having different energy distributions, the apparatus further comprises an energy subtraction processing means for carrying out energy subtraction processing on said two image signals representing the two images of the single object, which images have been recorded for energy subtraction processing and at each point of time, such that a pattern of the bone tissue may be extracted, a bone image signal being thereby obtained, and said bone trabecula pattern emphasizing means carries out said bone trabecula pattern emphasizing process on each of the bone image signals, which have thus been obtained from two different sets of images having been recorded at two different points of time.

34. An apparatus as defined in claim 32 wherein the apparatus further comprises a smoothing means for carrying out a smoothing process on each of said emphasized image signals, which are to be subjected to said position matching process.

35. An apparatus as defined in claim 32 wherein said bone trabecula pattern emphasizing process, which is carried out by said bone trabecula pattern emphasizing means, is skeleton processing in accordance with a morphology operation, which skeleton processing may be represented by Formula (1) shown below, and the image subjected to said morphology operation is represented by a high image density-high signal level type of image signal:

$$Smor = \bigcup_{\lambda = n1}^{N} \left\{ \max_{i=1,\ldots,n} (Sorg \ominus \lambda Bi) - \max_{i=1,\ldots,n} (Sorg \ominus \lambda Bi)_B \right\} \quad (1)$$

wherein the expression $X \ominus \lambda Y$ represents $\lambda$ times of Minkowski difference operations (erosion processings) carried out with the structure element Y and on the image signal X, the expression $(X \ominus \lambda Y)_Y$ represents the opening processing carried out with the structure element Y and on the image signal (X⊖λY), and $$\bigcup_{\lambda=n1}^{N} \{\}$$

represents the union of sets of { } with λ=n1, n1+1, ..., N.

36. An apparatus as defined in claim 35 wherein the value of n1 in Formula (1) is at least 2.

37. An apparatus as defined in claim 32 wherein said bone trabecula pattern emphasizing process, which is carried out by said bone trabecula pattern emphasizing means, is skeleton processing in accordance with a morphology operation, which skeleton processing may be represented by Formula (2) shown below, and the image subjected to said morphology operation is represented by a high luminance-high signal level type of image signal:

$$Smor = \bigcup_{\lambda=n1}^{N} \left\{ \min_{i=1,\ldots,n}(Sorg \oplus \lambda Bi) - \min_{i=1,\ldots,n}(Sorg \oplus \lambda Bi)^B \right\} \quad (2)$$

wherein the expression X⊕λY represents λ times of Minkowski sum operations (dilation processings) carried out with the structure element Y and on the image signal X, the expression $(X \oplus \lambda Y)^Y$ represents the closing processing carried out with the structure element Y and on the image signal (X⊕λY), and $$\bigcup_{\lambda=n1}^{N} \{\}$$

represents the union of sets of { } with λ=n1, n1+1, ..., N.

38. An apparatus as defined in claim 37 wherein the value of n1 in Formula (2) is at least 2.

* * * * *